United States Patent
Lam et al.

(10) Patent No.: US 11,327,306 B2
(45) Date of Patent: May 10, 2022

(54) ANGULAR PERFORMANCE OF APOCHROMATIC PANCHARATNAM BERRY PHASE COMPONENTS USING A C-PLATE

(71) Applicant: Facebook Technologies, LLC, Menlo Park, CA (US)

(72) Inventors: Wai Sze Tiffany Lam, Redmond, WA (US); Lu Lu, Kirkland, WA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 785 days.

(21) Appl. No.: 16/006,701

(22) Filed: Jun. 12, 2018

(65) Prior Publication Data
US 2019/0285890 A1    Sep. 19, 2019

Related U.S. Application Data

(60) Provisional application No. 62/643,691, filed on Mar. 15, 2018.

(51) Int. Cl.
*G02F 1/29*    (2006.01)
*G02B 27/01*   (2006.01)
(Continued)

(52) U.S. Cl.
CPC ....... *G02B 27/0172* (2013.01); *G02B 5/3016* (2013.01); *G02B 27/0025* (2013.01);
(Continued)

(58) Field of Classification Search
CPC ............ G02B 27/0025; G02B 27/0172; G02B 27/286; G02B 27/288; G02B 27/4261;
(Continued)

(56) References Cited

U.S. PATENT DOCUMENTS 7,397,525 B2 * 7/2008 Tago ................... G02F 1/13363
                                                      349/119
7,848,020 B2   12/2010 Hendrix et al.
(Continued)

FOREIGN PATENT DOCUMENTS

CN    101266313 A    9/2008
CN    101479655 A    7/2009
(Continued)

OTHER PUBLICATIONS

"Geometric Phase Lenses with Color Selective Filters ("GPL+CS")", ImagineOptix, Available at https://www.magineoptix.com/coming-soon-chromatic-aberration-correction-geometric-phase-lenses-red-green-blue-operation/, May 2, 2017, 3 pages.
(Continued)

*Primary Examiner* — Balram T Parbadia
(74) *Attorney, Agent, or Firm* — Artegis Law Group, LLP

(57) ABSTRACT

A near eye display (NED) includes multiple PBP optical elements combined with one or more C-plates to improve optical angular performance. The PBP optical elements may be configured for beam steering or for focusing light to a point. A C-plate may reduce or eliminate an undesirable polarization phase shift introduced by the PBP optical elements to angular, off-axis light. Birefringence of the PBP optical elements produces such a polarization phase shift. A C-plate provides an additional polarization phase shift that is opposite to the extra polarization phase shift by the PBP optical elements. Thus, the additional polarization phase shift by the C-plate at least partially reduces the phase shift by the PBP element.

21 Claims, 8 Drawing Sheets

(51) Int. Cl.

| | |
|---|---|
| *G02F 1/1335* | (2006.01) |
| *G02F 1/139* | (2006.01) |
| *G02F 1/13363* | (2006.01) |
| *G02B 27/28* | (2006.01) |
| *G02B 27/00* | (2006.01) |
| *G02B 5/30* | (2006.01) |
| *G02B 27/42* | (2006.01) |
| *G02F 1/1347* | (2006.01) |

(52) U.S. Cl.
CPC ......... *G02B 27/286* (2013.01); *G02B 27/288* (2013.01); *G02B 27/4261* (2013.01); *G02F 1/1393* (2013.01); *G02F 1/13363* (2013.01); *G02F 1/133504* (2013.01); *G02F 1/133526* (2013.01); *G02F 1/133528* (2013.01); *G02F 1/292* (2013.01); *G02B 2027/011* (2013.01); *G02B 2027/0116* (2013.01); *G02B 2027/0174* (2013.01); *G02F 1/1347* (2013.01); *G02F 1/133541* (2021.01); *G02F 1/133638* (2021.01); *G02F 1/294* (2021.01); *G02F 2203/05* (2013.01); *G02F 2203/24* (2013.01); *G02F 2413/02* (2013.01)

(58) Field of Classification Search
CPC .............. G02B 5/301; G02B 2027/011; G02B 2027/0116; G02B 2027/0174; G02B 27/01; G02B 27/28; G02B 5/3016; G02F 1/133504; G02F 1/133526; G02F 1/133528; G02F 1/13363; G02F 1/1393; G02F 1/292; G02F 1/1347; G02F 2001/133541; G02F 2001/133638; G02F 2001/294; G02F 2203/05; G02F 2203/24; G02F 2413/02; G02F 1/294; G02F 1/133541; G02F 1/133638; G02F 1/29
See application file for complete search history.

(56) References Cited

U.S. PATENT DOCUMENTS

| | | | |
|---|---|---|---|
| 9,335,548 B1 | 5/2016 | Cakmakci et al. | |
| 9,976,911 B1 | 5/2018 | Tabirian et al. | |
| 10,120,193 B2 | 11/2018 | Lam | |
| 10,151,961 B2 | 12/2018 | Lu et al. | |
| 10,451,947 B1 | 10/2019 | Lu et al. | |
| 10,539,829 B1 | 1/2020 | Lu et al. | |
| 10,546,430 B1 | 1/2020 | Lu et al. | |
| 2007/0258029 A1* | 11/2007 | Nakagawa | G02B 5/3016 349/119 |
| 2008/0309854 A1* | 12/2008 | Ge | G02F 1/13363 349/98 |
| 2009/0073331 A1 | 3/2009 | Shi et al. | |
| 2009/0279023 A1* | 11/2009 | Smith | G02F 1/133634 349/98 |
| 2012/0188467 A1* | 7/2012 | Escuti | G02F 1/1347 349/1 |
| 2015/0205182 A1 | 7/2015 | Leister | |
| 2016/0033698 A1 | 2/2016 | Escuti et al. | |
| 2016/0047956 A1 | 2/2016 | Tabirian et al. | |
| 2016/0209560 A1 | 7/2016 | Tabirian et al. | |
| 2017/0010466 A1* | 1/2017 | Klug | G02B 26/103 |
| 2017/0010488 A1* | 1/2017 | Klug | G02B 27/0172 |
| 2017/0115491 A1 | 4/2017 | Shi et al. | |
| 2018/0045953 A1 | 2/2018 | Fan et al. | |
| 2018/0129018 A1 | 5/2018 | Cheng et al. | |
| 2018/0164645 A1* | 6/2018 | Oh | G02B 27/017 |
| 2018/0210222 A1* | 7/2018 | Seo | G02B 27/283 |
| 2018/0231702 A1* | 8/2018 | Lin | G02B 5/1871 |
| 2018/0239177 A1* | 8/2018 | Oh | G02B 27/0172 |
| 2018/0275410 A1 | 9/2018 | Yeoh et al. | |
| 2018/0284464 A1 | 10/2018 | Lu et al. | |
| 2018/0292653 A1 | 10/2018 | Tervo | |
| 2019/0049732 A1* | 2/2019 | Lee | G02B 27/0081 |
| 2019/0075281 A1 | 3/2019 | Hall et al. | |
| 2019/0124152 A1 | 4/2019 | Iasi et al. | |
| 2020/0249626 A1 | 8/2020 | Bouchal et al. | |

FOREIGN PATENT DOCUMENTS

| | | |
|---|---|---|
| CN | 101672947 A | 3/2010 |
| CN | 106716223 A | 5/2017 |
| EP | 3351978 A1 | 7/2018 |
| WO | 0109685 A1 | 2/2001 |
| WO | 2005091628 A1 | 9/2005 |
| WO | 2008004692 A1 | 1/2008 |
| WO | 2011014743 A2 | 2/2011 |
| WO | 2016154537 A1 | 9/2016 |
| WO | 2018231784 A1 | 12/2018 |

OTHER PUBLICATIONS

Shibata et al. "The zone of comfort: Predicting visual discomfort with stereo displays". Journal of Vision, 2011, 53 pages.
Liu et al., "Generation of perfect vortex and vector beams based on Pancharatnam-Berry phase elements," Mar. 9, 2017, Nature, www.nature.com/scientificreports, 8 pages.
Cheng et al., "Concept for a transmissive, large angle, light steering device with high efficiency", vol. 40, Issue 9, pp. https://doi.org/10.1364/OL.40.002080, May 1, 2015, pp. 2080-2083.
Gao et al., "High-efficiency large-angle Pancharatnam phase deflector based on dual-twist design", vol. 25, Issue 6, https://doi.org/10.1364/OE.25.006283, Mar. 20, 2017, pp. 6283-6293.
McManamon et al., "A Review of Phased Array Steering for Narrow-Band Electrooptical System", Proceeding of IEEE, vol. 97, No. 6, Jun. 2009, pp. 1078-1096.
Wang et al., "Finite Difference Time-Domain Simulation of A Liquid Crystal Optical Phased Array", Journal of the Optical Society of America, vol. 22, No. 2, Feb. 2005, pp. 346-354.
Lin et al., "Retinal projection head-mounted display", https://link.springer.com/article/10 1007/s12200-016-0662-8, Oct. 15, 2016, 8 pages.
Maimone et al., "Holographic near-eye displays for virtual and augmented reality", ACM Transactions on Graphics, vol. 36, No. 4, Article 85, Jul. 2017, 16 pages.
Crawford, Gregory P. "Electrically Switchable BRAGG GRATINGS", Optics & Photonics News, Apr. 2003, pp. 54-59.
Caputo et al. "POLICRYPS Composite Materials: Features and Applications", In Advances in Composite Materials—Analysis of Natural and Man-Made Materials, Pavla Těšinova ed., 2011, DOI: 10.5772/17137, available at https://www.intechopen.com/books/advances-in-composite-materials-analysis-of-natural-and-man-made-materials/policryps-composite-materials-features-and-applications, 28 pages.
Liu et al., "Holographic Polymer-Dispersed Liquid Crystals: Materials, Formation, and Applications," Advances in OptoElectronics, vol. 2008, Article ID 684349,2008, doi:10 1155/2008/684349, 53 pages.
Doane, William J., "Polymer-Dispersed Liquid Crystals: Boojums at Work." MRS Bulletin, vol. 16, Jan. 1991, 10.1557/S0883769400057869, pp. 22-28.
Soto, Pedro Coutino, "Modeling and Characterization Of Dye-Doped Guest-Host Liquid Crystal Eyewear", PhD dissertation, Kent State University, Nov. 2015, 149 pages.
Moheghi, Alireza "Lc/Polymer Composites, Scattering Properties and Application in Displays", PhD dissertation, Kent State University, May 2017, 130 pages.
"AlphaMicron—The World's Fastest Tint-Changing Technology", http://alphamicron.com/, retrieved Feb. 28, 2020, 4 pages.
Final Office Action dated Aug. 6, 2021 for U.S. Appl. No. 16/006,706, filed Jun. 12, 2018, 16 Pages.
"Geometric Phase Lenses with Color Selective Fillers ("GPL+ CS")," Imagine Optix [online], May 2, 2017 [Retrieved on May 17, 2021], pp. 1-3, Retrieved from the internet: URL: https://imagineoptix.com/coming-soon-chromatic-aberration-correction-geometric-phase-lenses-red-green-blue-operation.

(56) References Cited

OTHER PUBLICATIONS

International Preliminary Report on Patentability for International Application No. PCT/US2019/022147, dated Sep. 24, 2020, 8 Pages.
International Preliminary Report on Patentability for International Application No. PCT/US2019/022334, dated Sep. 24, 2020, 8 Pages.
International Search Report and Written Opinion for International Application No. PCT/US2019/022147, dated Jun. 3, 2019, 11 Pages.
International Search Report and Written Opinion for International Application No. PCT/US2019/022334, dated May 31, 2019, 11 Pages.
International Search Report and Written Opinion for International Application No. PCT/US2019/062751, dated Feb. 12, 2020, 12 Pages.
International Search Report and Written Opinion for International Application No. PCT/US2019/063552, dated Mar. 6, 2020, 9 Pages.
Non-Final Office Action dated Feb. 5, 2021 for U.S. Appl. No. 16/006,706, filed Jun. 12, 2018, 16 pages.
Non-Final Office Action dated Dec. 9, 2020 for U.S. Appl. No. 16/355,612, filed Mar. 15, 2019, 16 pages.
Non-Final Office Action dated Jun. 12, 2020 for U.S. Appl. No. 16/006,706, filed Jun. 12, 2018 12 pages.
Non-Final Office Action dated Oct. 16, 2020 for U.S. Appl. No. 16/273,021, filed Feb. 11, 2019, 17 pages.
Notice of Allowance dated May 5, 2021 for U.S. Appl. No. 16/355,612, filed Mar. 15, 2019, 5 pages.
Notice of Allowance dated Jul. 6, 2021 for U.S. Appl. No. 16/355,612, filed Mar. 15, 2019, 8 pages.
Notice of Allowance dated Jul. 8, 2021 for U.S. Appl. No. 16/273,021, filed Feb. 11, 2019, 11 pages.
Notice of Allowance dated Apr. 13, 2021 for U.S. Appl. No. 16/273,021, filed Feb. 11, 2019, 9 pages.
Notice of Allowance dated Apr. 26, 2021 for U.S. Appl. No. 16/355,612, filed Mar. 15, 2019, 8 pages.
Restriction Requirement dated Dec. 4, 2019 for U.S. Appl. No. 16/006,706, filed Jun. 12, 2018, 6 Pages.
Shen S., et al., "Optimal Design of Achromatic True Zero-Order Waveplates Using Twisted Nematic Liquid Crystal," Journal of Optical Society of America, May 2005, vol. 22 (5), pp. 961-965.
Fan G., et al., "Foveated Imaging for Near-Eye Displays," Optics Express, Sep. 17, 2018, vol. 26 (19), p. 25076-25085, XP055525627.
Uchiyama A., et al., "Wide-Band Retardation Films with Reverse Wavelength Dispersion," In Proceedings of the 7th International Display Workshop (Society for Information Display), Nov. 29-Dec. 1, 2000, pp. 407-410.
Koon T-H., et al., "Non Twist Quarter-Wave Liquid Crystal Cell for a High-Contrast Reflective Display," Optics Letter, Oct. 15, 2000, vol. 25 (20), pp. 1547-1549.
Yousefzadeh C., et al., ""Achromatic limits" of Pancharatnam Phase Lenses," Applied Optics, Feb. 10, 2018, vol. 57 (5), pp. 1151-1158.
Zhan T., et al., "High-Resolution Additive Light Field Near-Eye Display by Switchable Pancharatnam-Berry Phase Lenses," Optics Express, Feb. 19, 2018, vol. 26 (4), XP055590399, pp. 4863-4872.
Office Action dated Dec. 16, 2021 for Chinese Application No. 201980019492.X, filed Mar. 13, 2019, 14 pages.
Office Action dated Jan. 25, 2022 for Chinese Application No. 201980019529.9, filed Mar. 14, 2019, 21 pages.
Non-Final Office Action dated Mar. 9, 2022 for U.S. Appl. No. 16/006,706, filed Jun. 12, 2018, 12 pages.

\* cited by examiner

ANGULAR PERFORMANCE OF APOCHROMATIC PANCHARATNAM BERRY PHASE COMPONENTS USING A C-PLATE

CROSS REFERENCE TO RELATED APPLICATION

This application claims priority benefit of the U.S. Provisional Patent Application titled, "Computer Generated Reality," filed on Mar. 15, 2018 and having Ser. No. 62/643, 691. The subject matter of this application is hereby incorporated herein by reference.

BACKGROUND

Field of the Various Embodiments

Embodiments of this disclosure relate generally to near eye displays and, more specifically, to the use of one or more C-plates to improve angular performance of apochromatic Pancharatnam Berry Phase components.

Description of the Related Art

Pancharatnam Berry Phase (PBP) or geometric phase components can be used in an optical assembly of a head-mounted display (HMD) that may be part of, for example, a virtual reality (VR) system, an augmented reality (AR) system, a mixed reality (MR) system, or some combination thereof. The PBP components can be made by liquid crystal (LC) or meta material. The PBP components can be implemented as PBP gratings and/or PBP lenses. Both types of PBP components, however, operate with a relatively strong dependency on wavelength. For example, the diffraction angle or the focus distance of a PBP component varies based upon the wavelength of light. Such a feature may reduce image quality of optical systems that employ PBP components and involve multiple wavelengths or color channels.

SUMMARY

Various embodiments set forth a near eye display (NED) that includes an electronic display configured to output image light. Further, the NED includes an apochromatic optical element comprising multiple PBP optical elements that are combined with one or more C-plates to improve optical angular performance. In some examples, the apochromatic optical element may be configured for beam steering (e.g. via diffraction). In other examples, the apochromatic optical element may be configured to be a lens.

A C-plate may reduce an undesirable polarization phase shift introduced by a PBP liquid crystal element to angular, off-axis light incident on the PBP element. Birefringence of the PBP element produces such a polarization phase shift. A C-plate adjacent to the PBP element and aligned with the optical axis provides an additional polarization phase shift to the light. The additional polarization phase shift, which is opposite to the polarization phase shift by the PBP element, depends on an angle with respect to the optical axis of the light incident on the C-plate. Thus, the additional polarization phase shift by the C-plate at least partially reduces the phase shift by the PBP element.

One advantage of techniques disclosed herein is that an apochromatic optical element may be used to operate on multiple wavelengths of light or color channels with reduced degradation in optical angular performance.

BRIEF DESCRIPTION OF THE DRAWINGS

So that the manner in which the above recited features of the various embodiments can be understood in detail, a more particular description of the disclosed concepts, briefly summarized above, may be had by reference to various embodiments, some of which are illustrated in the appended drawings. It is to be noted, however, that the appended drawings illustrate only typical embodiments of the disclosed concepts and are therefore not to be considered limiting of scope in any way, and that there are other equally effective embodiments.

DETAILED DESCRIPTION

Figure 1A:
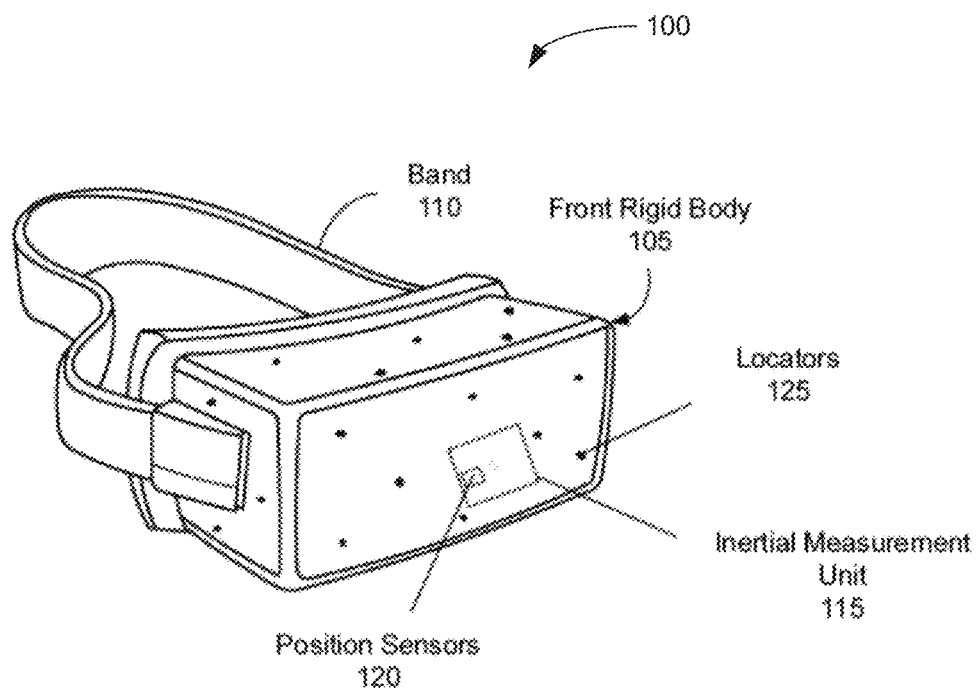
FIG. 1A is a diagram of a near eye display (NED), according to an embodiment.

In the following description, numerous specific details are set forth to provide a more thorough understanding of the various embodiments. However, it will be apparent to one of skilled in the art that the disclosed concepts may be practiced without one or more of these specific details.

Configuration Overview

One or more embodiments disclosed herein relate to the apochromatic configuration of a Pancharatnam Berry Phase (PBP) structure comprising a plurality of PBP elements and at least one C-plate. A PBP element, also referred to as a geometric phase element, may comprise an active liquid crystal or a liquid crystal polymer placed using photo-alignment technology, for example. PBP elements can achieve multiple or varying focal lengths when designed as a lens or multiple steering angles when designed as a steering element (also referred to as a "grating"). In some embodiments, the PBP element may be used for static or active operation of a display device.

A C-plate may at least partially compensate for a polarization phase shift imposed on off-axis light incident on the one or more PBP elements included in a PBP structure. A PBP element generally focuses off-axis light to a point (or steers off-axis light at an angle) that is dependent on the angle of incidence of the light onto the PBP element. Thus, for a PBP element operating with light having various angles of incidence (e.g., such as a converging or diverging light cone), such a dependency undesirably leads to images having a reduced quality, such as images comprising ghosts and chromatic aberration causing, among other things, the images to be blurred and appear unfocused.

In some embodiments, an apochromatic optical system may include three PBP elements, two color-selective wave plates, and three C-plates, though claimed subject matter is not limited in this respect. Herein, an apochromatic optical system generally refers to a system having one or more optical elements that at least partially correct for chromatic aberration of an image formed by the system. Such a system may be configured to receive light along an optical axis from a pixelated light valve (e.g., an electronic display such as an LCD display). The pixelated light valve may be illuminated by a light source that may produce at least partially coherent light. In some examples, the system may be configured to operate with multiple color channels (e.g., three) for different portions of the visible spectrum (e.g., red, green, and blue color channels). In some implementations, an electronic display may be configured to emit image light that includes the multiple color channels. In other implementations, the system may include an electronic display for individual color channels.

Each C-plate may at least partially compensate for excess birefringent retardance applied by one or more of the other optical elements in the apochromatic optical system for off-axis light. In some examples, one or more C-plates may be configured to compensate for off-axis birefringent effects of a particular optical element in the system. In some examples, a C-plate may compensate for one of the three PBP elements. In some examples, a C-plate may be disposed between a PBP element and a color-selective waveplate. One or more of the C-plates may implement multiple layers of birefringent films.

In some embodiments, multiple PBP elements, each associated with a different color channel, together form a PBP structure (e.g., a PBP stack), such as an apochromatic grating structure or an apochromatic lens structure. In various embodiments, each PBP element included in the PBP structure is configured to operate as a half-wave plate for a respective color channel, while operating as a full-wave plate (e.g., introducing no phase change) for other color channels. For a PBP grating structure, each of the PBP element included in the grating structure is configured such that light within a respective color channel is diffracted to a common angle. For a PBP lens structure, each of the PBP lenses included in the lens structure is configured such that light within a respective color channel is focused to a point that is common for all the color channels. The color-corrected lenses may be used in, for example, an optical element in a head-mounted display. Color-corrected lenses may be useful to deal with vergence—accommodation conflict in artificial reality environments.

For ease of discussion, the following description involves three color channels, each having a representative (e.g., central) wavelength. A color channel, however, may comprise a continuous spectrum of wavelengths. To simplify descriptions herein, the precise effect of the PBP lenses operating as wave plates on such a continuous spectrum is heuristically ignored and, instead, a representative wavelength within the associated color channel is considered. For example, the red color channel may be represented by wavelength of 630 nanometers, the green color channel may be represented by wavelength of 525 nanometers, and the blue color channel may be represented by wavelength of 490 nanometers, though the scope of the disclosure and the claims is not so limited.

Embodiments of the present disclosure may include or be implemented in conjunction with an artificial reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a head-mounted display (HMD) coupled to a host computer system, a standalone HMD, a mobile device or computing system, or any other hardware platform capable of providing artificial reality content to one or more viewers.

System Overview

FIG. 1A is a diagram of a near eye display (NED) 100, according to some embodiments. NED 100 includes a front rigid body 105 and a band 110. Front rigid body 105 includes one or more electronic display elements of an electronic display (not shown), an inertial measurement unit (IMU) 115, one or more position sensors 120, and locators 125. In the embodiment illustrated in FIG. 1A, position sensors 120 are located within IMU 115, and neither IMU 115 nor position sensors 120 are visible to the user. IMU 115, position sensors 120, and locators 125 are discussed in detail below with regard to FIG. 13. In various embodiments, where NED 100 acts as an AR or MR device, portions of NED 100 and/or its internal components are at least partially transparent.

Figure 1B:
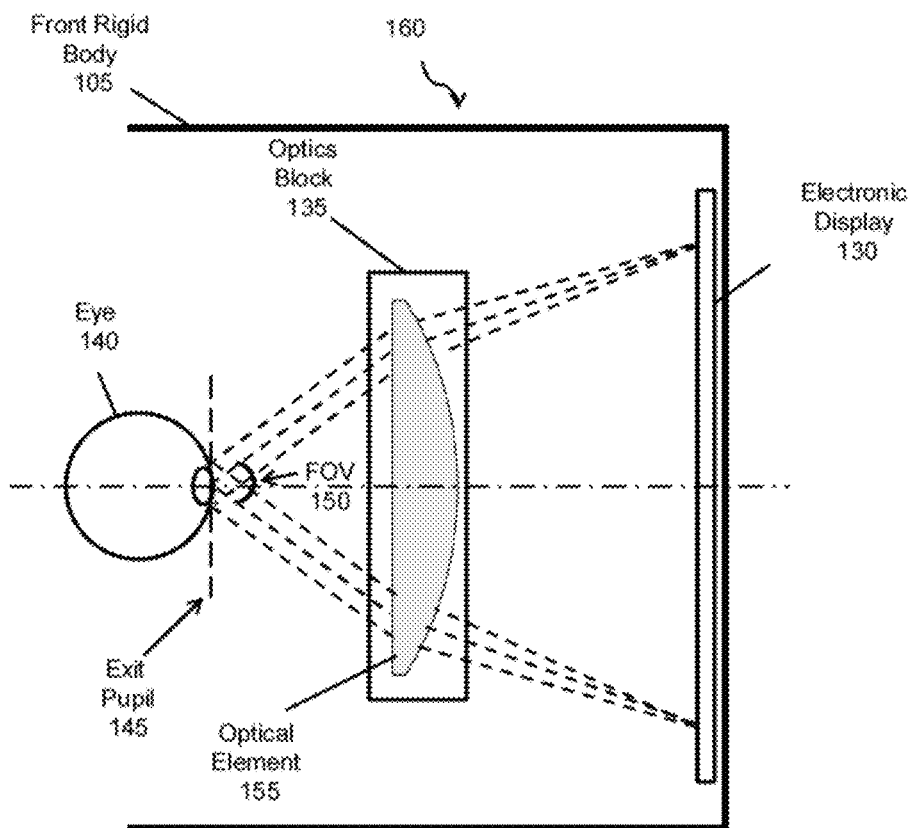
FIG. 1B is a cross section of the front rigid body of the embodiment of the NED illustrated in FIG. 1A.

FIG. 1B is a cross section 160 of front rigid body 105 of the embodiment of NED 100 illustrated in FIG. 1. Front rigid body 105 includes an electronic display 130 and an optics block 135 that together provide image light to an exit pupil 145. Exit pupil 145 is the location of the front rigid body 105 where a user's eye 140 may be positioned. For purposes of illustration, FIG. 1B illustrates a cross section 160 associated with a single eye 140, but another optics block, separate from optics block 135, may provide altered image light to another eye of the user. Additionally, NED 100 includes an eye tracking system (not shown in FIG. 1B). The eye tracking system may include one or more sources that illuminate one or both eyes of the user. The eye tracking system may also include one or more cameras that capture images of one or both eyes of the user to track the positions of the eyes.

Electronic display 130 displays images to the user. In various embodiments, electronic display 130 may comprise a single electronic display or multiple electronic displays (e.g., a display for each eye of a user). Examples of electronic display 130 include: a liquid crystal display (LCD), an organic light emitting diode (OLED) display, an active-matrix organic light-emitting diode display (AMOLED), a QOLED, a QLED, some other display, or some combination thereof.

Optics block 135 adjusts an orientation of image light emitted from electronic display 130 such that electronic display 130 appears at particular virtual image distances from the user. Optics block 135 is configured to receive image light emitted from electronic display 130 and direct the image light to an eye-box associated with exit pupil 145. The image light directed to the eye-box forms an image at a retina of eye 140. The eye-box is a region defining how much eye 140 moves up/down/left/right from without significant degradation in the image quality. In the illustration of FIG. 1B, a field of view (FOV) 150 is the extent of the observable world that is seen by eye 140 at any given moment.

Additionally, in some embodiments, optics block 135 magnifies received light, corrects optical errors associated with the image light, and presents the corrected image light to eye 140. Optics block 135 may include one or more optical elements 155 in optical series. An optical element 155 may be an aperture, a Fresnel lens, a convex lens, a concave lens, a filter, a waveguide, a PBP lens or grating, a color-selective filter, a waveplate, a C-plate, or any other suitable optical element 155 that affects the image light. Moreover, optics block 135 may include combinations of different optical elements. In some embodiments, one or more of the optical elements in optics block 135 may have one or more coatings, such as anti-reflective coatings. Optics block 135 may include components that are discussed in detail in conjunction with FIGS. 5-12.

Figure 2A:
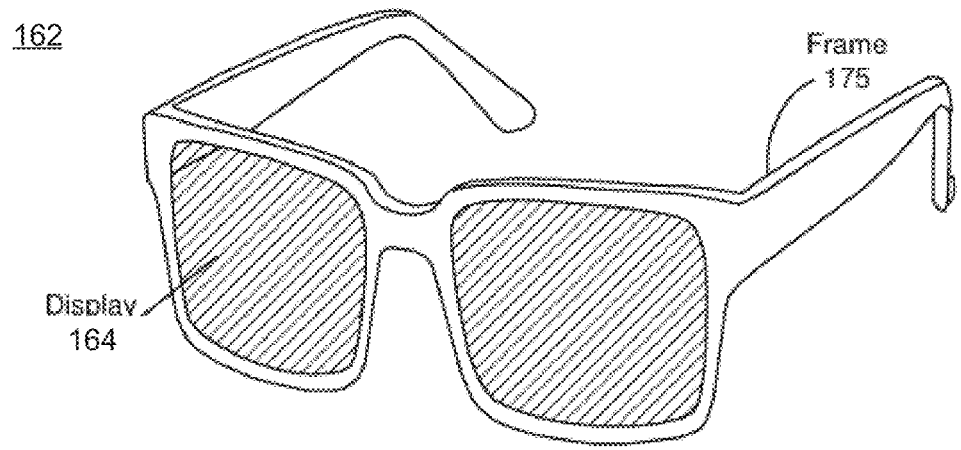
FIG. 2A is a diagram of an HMD implemented as a near eye display, according to an embodiment.

FIG. 2A is a diagram of an HMD 162 implemented as a near eye display, according to an embodiment. In this embodiment, HMD 162 is in the form of a pair of augmented reality glasses. HMD 162 presents computer-generated media to a user and augments views of a physical, real-world environment with the computer-generated media. Examples of computer-generated media presented by HMD 162 include one or more images, video, audio, or some combination thereof. In some embodiments, audio is presented via an external device (e.g. speakers and headphones) that receives audio information from HMD 162, a console (not shown), or both, and presents audio data based on audio information. In some embodiments, HMD 162 may be modified to also operate as a virtual reality (VR) HMD, a mixed reality (MR) HMD, or some combination thereof. HMD 162 includes a frame 175 and a display 164. In this embodiment, frame 175 mounts the near eye display to the user's head, while display 164 provides image light to the user. Display 164 may be customized to a variety of shapes and sizes to conform to different styles of eyeglass frames.

Figure 2B:
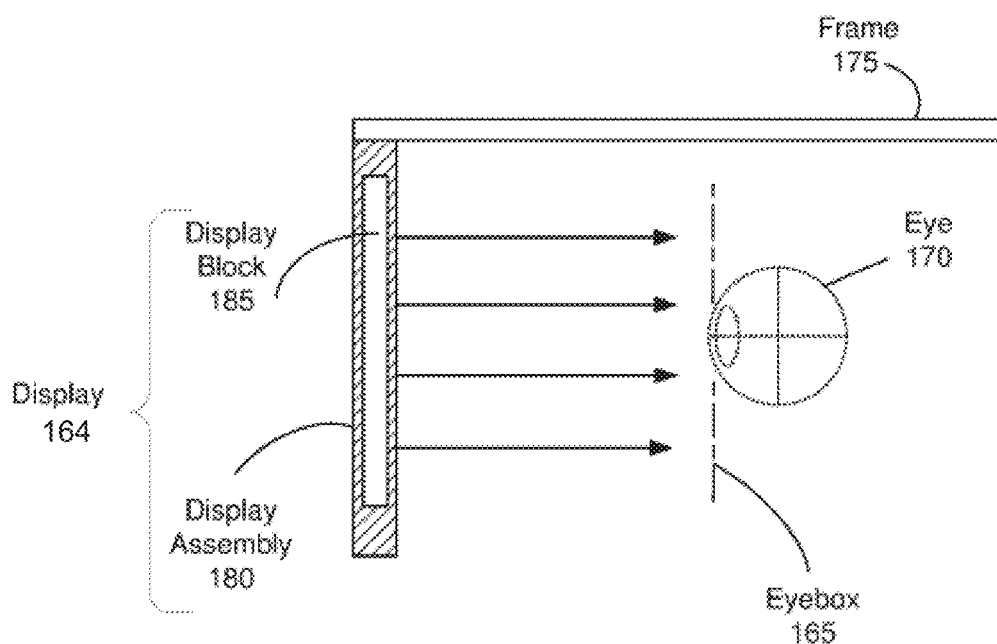
FIG. 2B is a cross-section view of an HMD of FIG. 2A implemented as a near eye display, according to an embodiment.

FIG. 2B is a cross-section view of the HMD of FIG. 2A implemented as a near eye display, according to an embodiment. FIG. 2B shows a cross-section view of HMD 162 implemented as a near eye display. This view includes frame 175, display 164 (which comprises a display assembly 180 and a display block 185), and eye 170. The display assembly 180 supplies image light to eye 170. Display assembly 180 houses display block 185, which, in different embodiments, encloses the different types of imaging optics and redirection structures. For purposes of illustration, FIG. 2B shows the cross section associated with a single display block 185 and a single eye 170, but in alternative embodiments not shown, another display block, which is separate from display block 185 shown in FIG. 2B, provides image light to another eye of the user.

Display block 185, as illustrated, is configured to combine light from a local area with light from computer generated image to form an augmented scene. Display block 185 is also configured to provide the augmented scene to eyebox 165 corresponding to a location of a user's eye 170. Display block 185 may include, for example, a waveguide display, a focusing assembly, a compensation assembly, or some combination thereof. As described below for some embodiments, PBP structures may be placed on one or both sides of display block 185 to affect various parameters (e.g., focal length, optical power, image quality, and so on) of the optical system.

HMD 162 may include one or more other optical elements between display block 185 and eye 170. The optical elements may act to, for example, correct aberrations in image light emitted from display block 185, magnify image light emitted from display block 185, some other optical adjustment of image light emitted from display block 185, or some combination thereof. The example for optical elements may include an aperture, a Fresnel lens, a convex lens, a concave lens, a filter, or any other suitable optical element that affects image light. Display block 185 may comprise one or more materials (e.g., plastic, glass, etc.) with one or more refractive indices that effectively minimize the weight and widen a field of view of HMD 162. In some embodiments, one or more components of display block 185 are implemented as a PBP structure having a stack of PBP plates, which are described in greater detail below.

Figure 3:
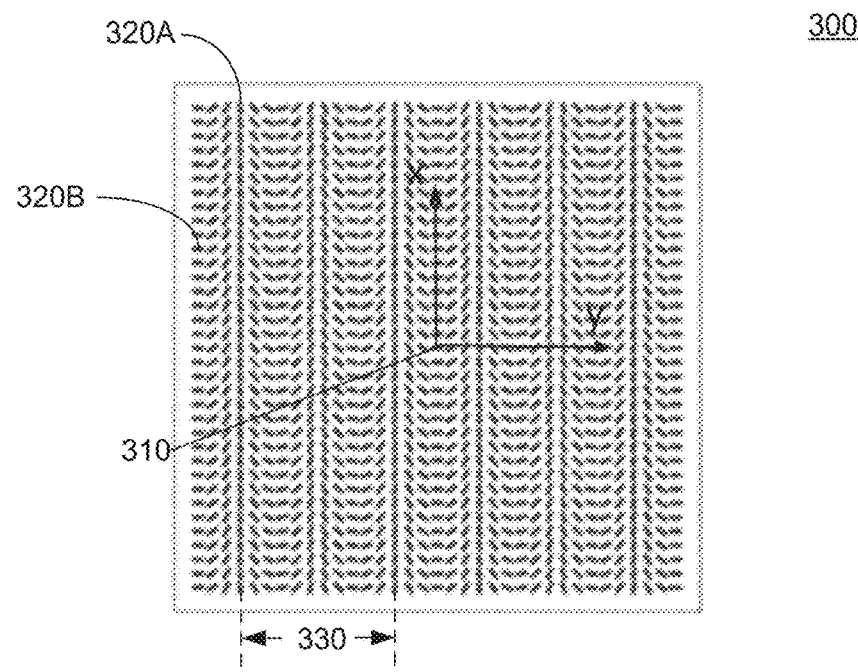
FIG. 3 illustrates an example of a PBP grating, according to an embodiment.

FIG. 3 illustrates a PBP grating 300, according to various embodiments. Mutually orthogonal x and y-axes 310 are illustrated for reference. The z-axis, not illustrated, is perpendicular to the x-y plane and along an optical axis of grating 300.

Grating 300 includes liquid crystals 320 that are oriented in a linearly repetitive pattern. In FIG. 3, the liquid crystals are illustrated as short line segments aligned so as to schematically represent orientations of the liquid crystals. For example, liquid crystal 320A is oriented in the x-direction while liquid crystal 320B is oriented in the y-direction. Liquid crystals between 320A and 320B are aligned along directions intermediate to the x and y-directions. The liquid crystals having such a patterned orientation give rise to a geometric-phase shift of light as a consequence of polarization evolution as light waves of the light propagate through the liquid crystals. In various embodiments, orientations of the liquid crystals along the x-axis are constant for a particular x-y plane of grating 300. Further, though not illustrated, in various embodiments, orientations of the liquid crystals in a direction perpendicular to the x-y plane (the z-axis) may vary in a rotational fashion (e.g., a twisted structure).

The linearly repetitive pattern of grating 300 has a pitch that is half the distance 330 along the y-axis between repeated portions of the pattern. Pitch 330 determines, in part, the optical properties of grating 300. For example, polarized light incident along the optical axis on grating 300 results in a grating output comprising primary, conjugate, and leakage light respectively corresponding to diffraction orders m=+1, −1, and zero. Although m=+1 is herein considered to be the primary order and the conjugate order is considered to be the m=−1 order, the designation of the orders could be reversed or otherwise changed. The pitch determines the diffraction angles (e.g., beam-steering angles) of the light in the different diffraction orders. Generally, the smaller the pitch, the larger the angles for a given wavelength of light.

Figure 4:
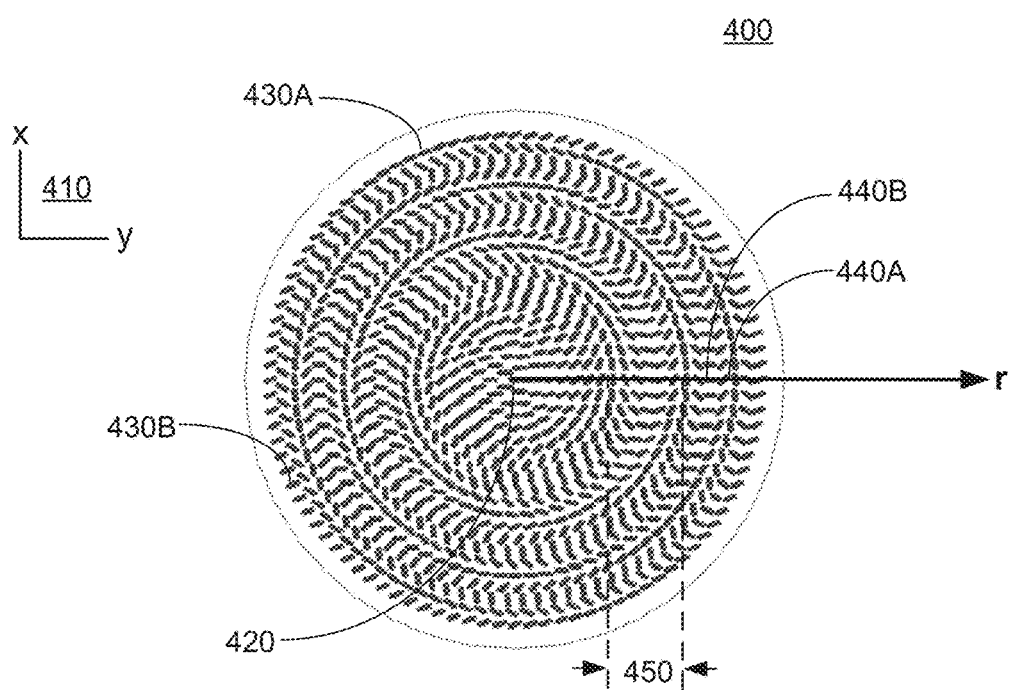
FIG. 4 illustrates an example of a PBP lens, according to an embodiment.

FIG. 4 is a top view of an example PBP lens 400, according to various embodiments. Mutually orthogonal x and y-axes 410 are illustrated for reference. The z-axis, not illustrated, is perpendicular to the x-y plane and along an optical axis of lens 400. An r-axis, in the x-y plane, represents a radial direction and distance from the center 420 of lens 400.

Lens 400 includes liquid crystals 430 that are oriented in a radially and circumferentially repetitive pattern. In the figure, the liquid crystals are illustrated as short line segments aligned so as to schematically represent orientations of the liquid crystals. For example, for a fixed distance from the optical axis, liquid crystal 430A is oriented in a circumferential direction while liquid crystal 430B is oriented in a radial direction. Liquid crystals between 430A and 430B are aligned along directions intermediate to circumferential and radial directions. As another example, along a fixed radial direction, liquid crystal 440A is oriented in a circumferential direction while liquid crystal 440B is oriented in a radial direction. Liquid crystals between 440A and 440B are aligned along directions intermediate to circumferential and radial directions. The liquid crystals having such a patterned orientation give rise to a geometric-phase shift of light as a consequence of polarization evolution as light waves of the light propagate through the liquid crystals. Though not illustrated, orientations of the liquid crystals in a direction perpendicular to the x-y plane (the z-axis) may vary in a rotational fashion (e.g., a twisted structure).

The radially repetitive pattern of lens 400 has a pitch 450, which is the distance along the r-axis between repeated portions of the pattern. Generally, pitch 450 may vary in a radial direction. For example, the distance along the r-axis between repeated portions of the pattern may decrease as r increases. Thus, pitch 450 may be larger closer toward center 420. The pitch determines, in part, the optical properties of lens 400. For example, polarized light incident along the optical axis on lens 400 results in a lens output of light having a particular focal length for a particular wavelength of light. The pitch determines such a focal length. Generally, the smaller the pitch, the smaller the focal length for a given wavelength of light.

Classically, a wavefront of light is controlled by adjusting optical path length (OPL), defined for an isotropic material as the product of the speed of the wave (dependent on the material's refractive index) and the physical propagation distance of the wave through the material. For a classical lens, the spatially varying OPL caused by a curved surface of a lens results in a phase shift of the wavefront giving rise to a focal length of the lens. A geometric-phase shift of a PBP lens, in contrast, arises from the evolution of lightwaves through the anisotropic volume of the PBP lens. The phase shift depends on the geometry of the pathway of the individual lightwaves through the anisotropy, which transforms the lightwaves. For example, molecular anisotropy and nanostructures of liquid crystals in the PBP lens lead to a phase shift of transmitted or reflected lightwaves. Such a phase shift is directly proportional to the orientation of an effective optic axis and the orientation of the anisotropic liquid crystals.

In some embodiments, PBP lenses, such as PBP lens 400 may be active (also referred to as an "active element") or passive (also referred to as a "passive element"). An active PBP lens, for example, has three optical states: an additive state, a neutral state, and a subtractive state. The additive state adds optical power to the system, the neutral state does not affect the optical power of the system and does not affect the polarization of light passing through the active PBP lens, and the subtractive state subtracts optical power from the system.

The state of an active PBP lens is determined by the handedness of polarization of light incident on the active PBP lens and a measure of the voltage applied to the active PBP lens. For example, in some embodiments, an active PBP lens operates in a subtractive state responsive to incident light with a right-handed circular polarization and an applied voltage of zero (or more generally, below a threshold voltage value). In some embodiments, an active PBP lens operates in an additive state responsive to incident light with a left-handed circular polarization, and an applied voltage of zero. In some embodiments, an active PBP lens operates in a neutral state (regardless of polarization) responsive to an applied voltage larger than a threshold voltage. An applied voltage larger than the threshold voltage aligns liquid crystals with a positive dielectric anisotropy along the electric field direction associated with the applied voltage. If the active PBP lens is in the additive or subtractive state, then light output from the active PBP lens has a handedness that is opposite of the handedness of light input into the active PBP lens. In contrast, if the active PBP lens is in the neutral state, then light output from the active PBP lens has the same handedness as the light input into the active PBP lens.

A passive PBP lens has two optical states: an additive state and a subtractive state. The state of a passive PBP lens is determined by the handedness of polarization of light incident on the passive PBP lens. In general, the passive PBP lens outputs light that has a handedness that is opposite of the light input into the passive PBP lens. For example, in some embodiments, a passive PBP lens operates in a subtractive state responsive to incident light with a right handed polarization and operates in an additive state responsive to incident light with a left handed polarization.

In some embodiments, a PBP grating, such as 300, may be active (also referred to as an "active element") or passive (also referred to as a "passive element"). An active PBP grating, for example, has three optical states, similar to that of an active PBP lens: an additive state, a neutral state, and a subtractive state. In an additive state, the active PBP grating diffracts light of a particular wavelength to an angle that is positive relative to the diffraction angle of the subtractive state. In the subtractive state, the active PBP grating diffracts light at a particular wavelength to an angle that is negative relative to the positive angle of the additive state. On the other hand, in the neutral state, the PBP grating does not lead to a diffraction of light and does not affect the polarization of light passing through the active PBP grating.

The state of an active PBP grating is determined by a handedness of polarization of light incident on the active PBP grating and a measure of the voltage applied to the active PBP grating. For example, in some embodiments, an active PBP grating operates in a subtractive state responsive to incident light with a right-handed circular polarization and an applied voltage of zero (or, more generally, below a threshold voltage value). In some embodiments, the PBP grating operates in an additive state responsive to incident light with a left-handed circular polarization and an applied voltage of zero. In some embodiments, the PBP grating and operates in a neutral state (regardless of polarization) responsive to an applied voltage larger than a threshold voltage. An applied voltage larger than the threshold voltage aligns liquid crystals with positive dielectric anisotropy along the electric field direction associated with the applied voltage. If the active PBP grating is in the additive or subtractive state, then light output from the active PBP grating has a handedness that is opposite the handedness of light input into the active PBP grating. If the active PBP grating is in the neutral state, then light output from the active PBP grating has the same handedness as the light input into the active PBP grating.

The state of a passive PBP grating is determined by a handedness of polarization of light incident on the passive PBP grating. For example, in some embodiments, a passive PBP grating operates in a subtractive state responsive to incident light with a right-handed circular polarization. In some embodiments, the passive PBP grating operates in an additive state responsive to incident light with a left-handed circular polarization. For the passive PBP grating in the additive or subtractive state, light output from the passive PBP grating has a handedness that is opposite the handedness of light input into the passive PBP grating.

Figure 5:
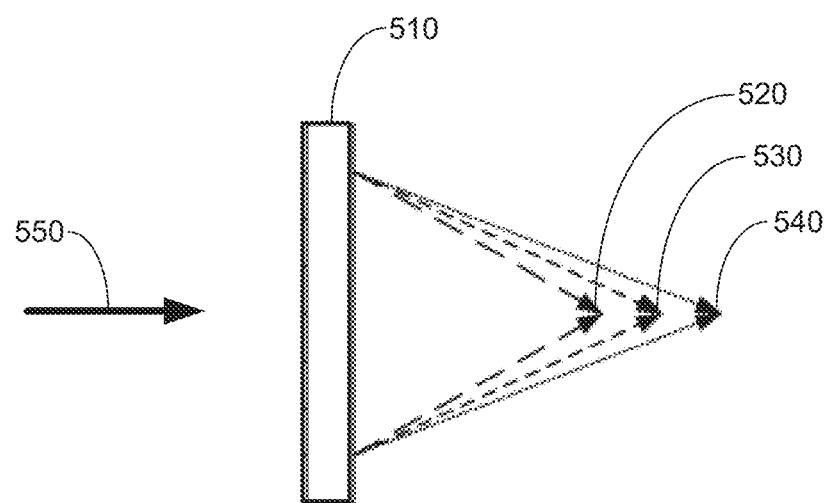
FIG. 5 illustrates color dispersive focal points that may arise from a PBP lens, according to an embodiment.

FIG. 5 illustrates a PBP lens 510 that focuses light of different color channels to different focal points, according to various embodiments. In the figure, different color channels are represented by lines having different dash styles.

The effect of the periodicity or the distribution of patterned liquid crystals of PBP lens 510 is wavelength dependent. Accordingly, incident light of different wavelengths (or color channels) is focused differently by PBP lens 510.

As shown in FIG. 5, PBP lens 510 receives incident light 550 comprising light of different color channels, each color channel associated with a different wavelength range (e.g., red, green, and blue color channels). Because the location (e.g., focus distance) of a focal point of PBP lens 510 is based on wavelength of incident light 550, the different color channels do not focus in the same focal plane. For example, lens 510 may focus light of a red color channel (or, more precisely, a particular wavelength of the spectral band of the red color channel) at focal point 520. Similarly, lens 510 may focus light of a green color channel (or, more precisely, a particular wavelength of the spectral band of the green color channel) at focal point 530, and may focus light of a blue color channel (or, more precisely, a particular wavelength of the spectral band of the blue color channel) at focal point 530.

As a result, lens 510 may produce an effect resulting from a failure of the lens to focus light of different color channels to the same convergence (e.g., focal) point. For example, in some embodiments, the different focal lengths of the different color channels undesirably lead to images having a reduced quality, such as images comprising ghosts and chromatic aberration causing the images to be blurred and appear unfocused.

Figure 6:
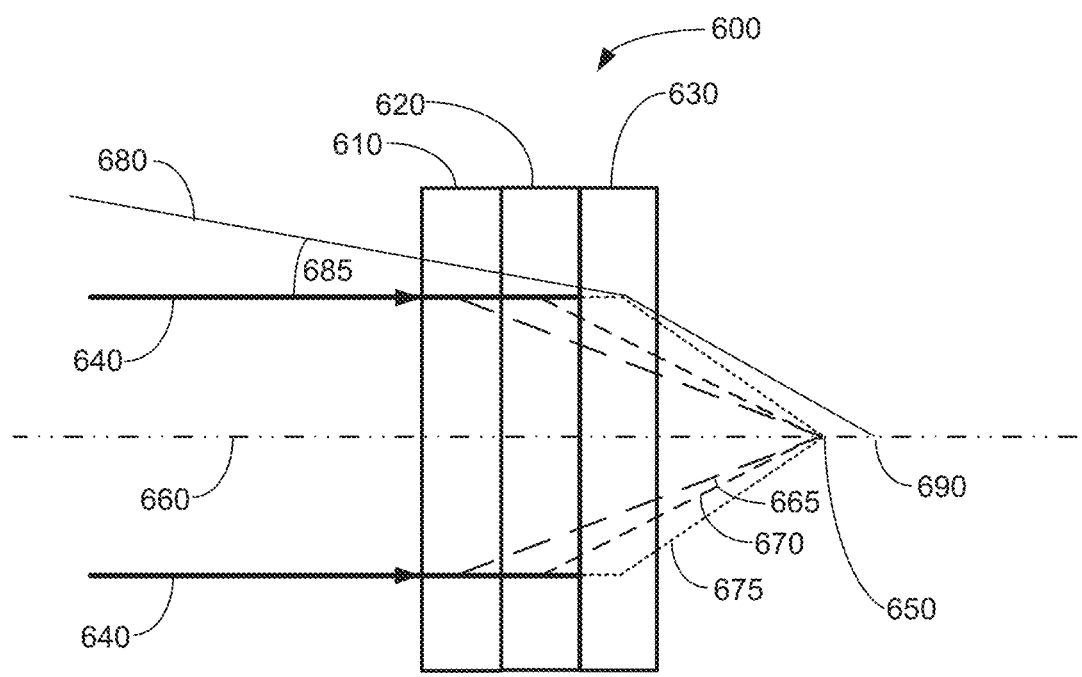
FIG. 6 illustrates a common focal point of an apochromatic PBP structure for various color channels, according to an embodiment.

FIG. 6 illustrates an apochromatic PBP lens stack 600, according to various embodiments. PBP lens stack 600 comprises a first PBP lens 610, a second PBP lens 620, and a third PBP lens 630, each associated with a different color channel (e.g., red, green, and blue). In various embodiments, lens stack 600 is configured to address the problem associated with PBP lens 510 having different focal lengths for different wavelengths.

Each of PBP lenses 610, 620, and 630 focuses a portion of input light 640 of the respective color channel to a common focal point 650 on optical axis 660 while being substantially transparent to the portion of input light 640 corresponding to the remaining color channels. For example, PBP lens 610 focuses light 665 of the red color channel to focal point 650 while PBP lenses 620 and 630 are substantially transparent to the light of the red color channel. Similarly, PBP lens 620 focuses light 670 of the green color channel to focal point 650 while PBP lenses 610 and 630 are substantially transparent to the light of the green color channel. Finally, PBP lens 630 focuses light 675 of the blue color channel to focal point 650 while PBP lenses 610 and 620 are substantially transparent to the light of the blue color channel.

Focusing of selective color channels, as described above, is performed by PBP lenses that are configured to behave as waveplates having particular characteristics. For example, each of PBP lenses 610, 620, and 630 behaves as a half-wave plate and provides focusing power for one color corresponding to its respective color channel, but behaves as a full-wave plate for two colors respectively and provides no focusing power corresponding to the other color channels. Accordingly, each of PBP lenses 610, 620, and 630 operates as a waveplate that is enabled for one wavelength (e.g., color channel), but is disabled for the other two wavelengths (e.g., color channels).

As described above, apochromatic PBP lens stack 600 focuses light of different color channels to a single common focal point 650 for input light 640, which is perpendicularly incident on lens stack 600 and parallel with optical axis 660. Such light is herein referred to as axis-parallel light. FIG. 6 also illustrates off-axis light 680 having an angle of incidence 685 with respect to optical axis 660. Each of PBP lenses 610, 620, and 630 is birefringent and thus performs with a dependency on wavelength and incident angle. The dependency on wavelength is considered and discussed above, and dealt with by configuring each of the PBP lenses to behave as waveplates having characteristics as described above. The dependency on incident angle is now considered and discussed.

Though each of PBP lenses 610, 620, and 630 is configured to behave as a half-wave plate for one color channel and as a full-wave plate for the two other color channels, such a configuration holds only for axis-parallel light 640 (or substantially axis-parallel light) and not off-axis light, for example, off-axis light 680. For instance, a half-wave plate provides a half wave birefringence to axis-parallel light 640, but provides an added birefringent term that depends on angle 685. This added birefringent term detrimentally affects the behavior of PBP lenses 610, 620, and 630 to behave as a half-wave plate for one color channel and as a full-wave plate for the two other color channels. Thus, for off-axis light 680, undesired extra focus or ghost image for apochromatic PBP lens stack 600 may be at a focal point 690 instead of the desired single common focal point 650. As discussed below, one or more C-plates may be added to apochromatic PBP lens stack 600 to compensate for the added birefringent term so that off-axis light leakage is reduced and the majority of the off-axis light may be focused at common focal point 650 instead of at focal point 690.

Figure 7:
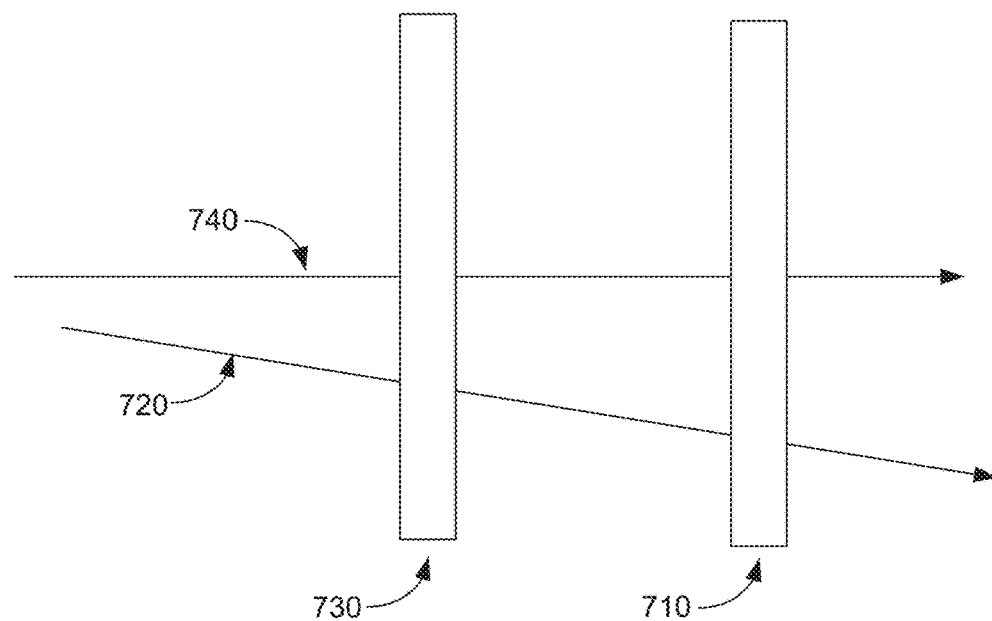
FIG. 7 illustrates an effect of a C-plate on off-axis light incident on a PBP lens, according to an embodiment.

FIG. 7 illustrates an effect of a C-plate 710 on off-axis light 720 incident on a PBP lens 730, which may be configured to behave as a half-wave plate, according to various embodiments. Birefringent effects of C-plate 710 may at least partially compensate for birefringent effects of PBP lens 730 for off-axis light. Such compensation, for example, may provide a benefit of off-axis light being focused at or at least relatively near (as compared to the case without a C-plate) a common focal point (e.g., 650) along with axis-parallel light.

In various embodiments, a C-plate, which may be a multilayer-birefringent film made by stretch polymer or LC materials, for example, is an optical birefringent retarder having an axis of optical symmetry along a direction that is normal (perpendicular) to the substantially parallel plate. A C-plate retarder does not present any net retardation for normal-incidence (e.g., axis-parallel) light. Non-normal (e.g., off-axis) light, however, gives rise to optical anisotropy and the C-plate can apply a retardance to such light. The optically anisotropic is due to an effective index of refraction for extra-ordinary rays being different from an index of refraction for ordinary rays. Thus, a C-plate provides zero birefringence for axis-parallel light while providing non-zero birefringence off-axis light. In particular, non-zero birefringence is a function of the angle with respect to the C-plate normal of the off-axis light. A C-plate can be configured to have a birefringence that has the same angular dependency as the birefringence of an adjacent PBP lens. Moreover, the C-plate can be configured to have a birefringence that is opposite to the birefringence of the adjacent PBP lens. In this way, birefringent effects of the C-plate may at least partially compensate for birefringent effects of the PBP lens for off-axis light, and vice versa.

Returning to FIG. 7, only PBP lens 730 provides birefringent retardation to axis-parallel light 740, while C-plate 710 provides zero birefringent to axis-parallel light 740. However, both C-plate 710 and PBP lens 730 provide birefringent retardation to off-axis light 720. In some embodiment, such birefringent effects are opposite to one another; PBP lens 730 provides more than halfwave birefringence, while C-plate 720 provides the opposite birefringence which cancels just the extra birefringence from PBP lens 730, so that the overall birefringence provided by the stack is still that of a halfwave. Such cancellation may lead to off-axis light leakage reduction and ensures most energy is being focused at a focal point that is the same as the focal point for axis-parallel light.

Figure 8:
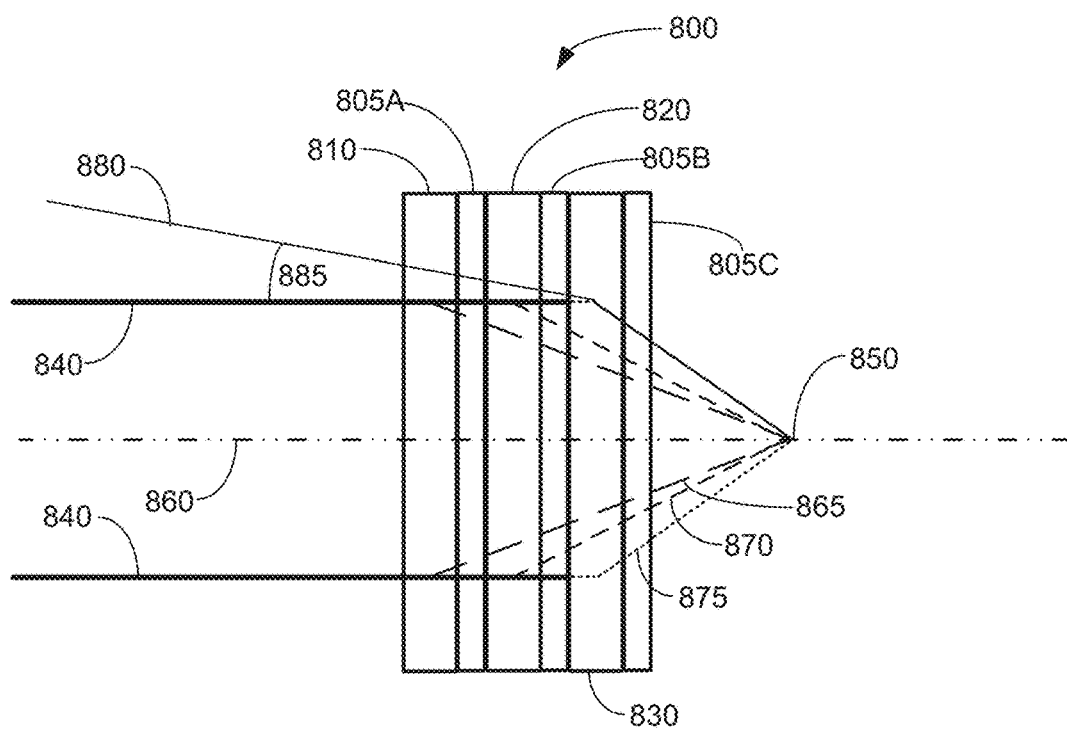
FIG. 8 illustrates a stack of PBP lenses that includes C-plates, according to an embodiment.

FIG. 8 illustrates an apochromatic PBP lens stack 800, according to various embodiments. PBP lens stack 800 is similar to PBP lens stack 600 with the addition of C-plates 805A, 805B, and 805C, as described below. PBP lens stack 800 comprises a first PBP lens 810, a second PBP lens 820, and a third PBP lens 830, each associated with a different color channel (e.g., red, green, and blue).

Each of PBP lenses 810, 820, and 830 focuses a portion of axis-parallel input light 840 of the respective color channel to a common focal point 850 on optical axis 860 while being substantially transparent to the portion of axis-parallel input light 840 corresponding to the remaining color channels. For example, PBP lens 810 focuses light 865 of the red color channel to focal point 850 while PBP lenses 820 and 830 are substantially transparent to the light of the red color channel. Similarly, PBP lens 820 focuses light 870 of the green color channel to focal point 850 while PBP lenses 810 and 830 are substantially transparent to the light of the green color channel. Finally, PBP lens 830 focuses light 875 of the blue color channel to focal point 850 while PBP lenses 810 and 820 are substantially transparent to the light of the blue color channel.

Though each of PBP lenses 810, 820, and 830 is configured to behave as a half-wave plate for one color channel and as a full-wave plate for the two other color channels, such a configuration holds only for axis-parallel light 840 (or substantially axis-parallel light) and not off-axis light, for example off-axis light 880 having an angle of incidence 885 with respect to optical axis 860. For example, a half-wave plate provides a half wave birefringence to axis-parallel light 840, but provides an added birefringent term that depends on angle 885. This added birefringent term detrimentally affects the behavior of PBP lenses 810, 820, and 830 as a half-wave plate for one color channel and as a full-wave plate for the two other color channels. Thus, for off-axis light 880, due to light leakage from non-halfwave birefringence from the PBP lens, a focal length for apochromatic PBP lens stack 800 may be at a focal point other than the desired single common focal point 850. As discussed below, one or more C-plates may be added to apochromatic PBP lens stack 800 to compensate for the added birefringent term so that most of the off-axis light for each color channel may be focused at common focal point 850.

In various embodiments, C-plates may be included for each color channel in an apochromatic PBP lens stack to compensate for added birefringence arising from off-axis input light. In the example of FIG. 8, for a first color channel, C-plate 805A is adjacent to the output side of PBP lens 810. For a second color channel, C-plate 805B is adjacent to the output side of PBP lens 820. For a third color channel, C-plate 805C is adjacent to the output side of PBP lens 830. In comparison to axis-parallel light 840, off-axis light 880 travelling through PBP lens 810 experiences an additional phase term due to the additional birefringence that is concomitant with light at a non-zero incident angle. Thus, at the output side of PBP lens 810, off-axis light 880 includes the additional phase term for the first color channel. Subsequently, the off-axis light traveling through C-plate 805A experiences a phase term that is equal and opposite to the additional phase term imposed by PBP lens 810. Thus, at the output side of C-plate 805A, off-axis light 880 no longer includes the additional phase term imposed earlier by PBP lens 810. By this process, most of the off-axis light 880 for the first color channel may be focused at the same focal point (e.g., 850) as axis-parallel light 840.

Similar to PBP lens 810 described above, in comparison to axis-parallel light 840, off-axis light 880 travelling through PBP lens 820 experiences an additional phase term due to the additional birefringence that is concomitant with light at a non-zero incident angle. Thus, at the output side of PBP lens 820, off-axis light 880 includes the additional phase term for the second color channel. Subsequently, the off-axis light traveling through C-plate 805B experiences a phase term that is equal and opposite to the additional phase term imposed by PBP lens 820. Thus, at the output side of C-plate 805B, off-axis light 880 no longer includes the additional phase term imposed earlier by PBP lens 820. By this process, off-axis light 880 for the second color channel may be focused at the same focal point (e.g., 850) as axis-parallel light 840. Finally, in comparison to axis-parallel light 840, off-axis light 880 travelling through PBP lens 830 experiences an additional phase term due to the additional birefringence that is concomitant with light at a non-zero incident angle. Thus, at the output side of PBP lens 830, off-axis light 880 includes the additional phase term for the third color channel. Subsequently, this off-axis light traveling through C-plate 805C experiences a phase term that is equal and opposite to the additional phase term imposed by PBP lens 830. Thus, at the output side of C-plate 805C, off-axis light 880 does not include the additional phase term imposed earlier by PBP lens 830. By this process, off-axis light 880 for the third color channel may be focused at the same focal point (e.g., 850) as for axis-parallel light 840.

Figure 9:
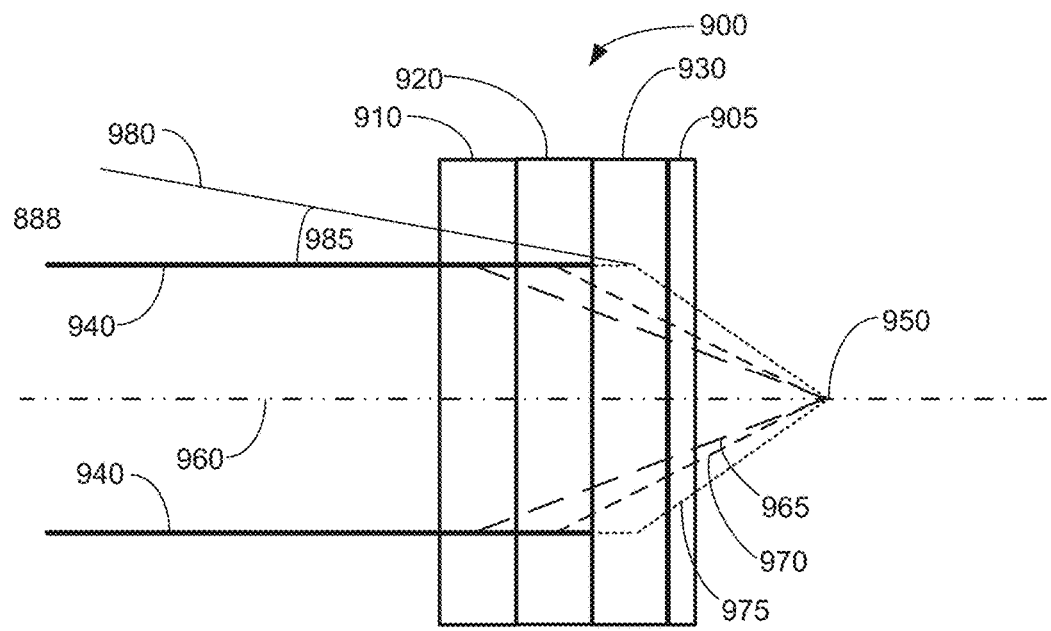
FIG. 9 illustrates a stack of PBP lenses that includes a single multilayer C-plate, according to an embodiment.

FIG. 9 illustrates a stack of PBP lenses that includes a single multilayer C-plate, according to various embodiments. PBP lens stack 900 is similar to PBP lens stack 600 with the addition of a single C-plate 905, as described below. PBP lens stack 900 comprises a first PBP lens 910, a second PBP lens 920, and a third PBP lens 930, each associated with a different color channel (e.g., red, green, and blue).

Each of PBP lenses 910, 920, and 930 focuses a portion of axis-parallel input light 940 of the respective color channel to a common focal point 950 on optical axis 960 while being substantially transparent to the portion of axis-parallel input light 940 corresponding to the remaining color channels. For example, PBP lens 910 focuses light 965 of the red color channel to focal point 950 while PBP lenses 920 and 930 are substantially transparent to the light of the red color channel. Similarly, PBP lens 920 focuses light 970 of the green color channel to focal point 950 while PBP lenses 910 and 930 are substantially transparent to the light of the green color channel. Finally, PBP lens 930 focuses light 975 of the blue color channel to focal point 950 while PBP lenses 910 and 920 are substantially transparent to the light of the blue color channel.

Though each of PBP lenses 910, 920, and 930 is configured to behave as a half-wave plate for one color channel and as a full-wave plate for the two other color channels, such a configuration holds only for axis-parallel light 940 (or substantially axis-parallel light) and not off-axis light, for example off-axis light 980 having an angle of incidence 985 with respect to optical axis 960. For example, a half-wave plate provides a half wave birefringence to axis-parallel light 940, but provides an added birefringent term that depends on angle 985. This added birefringent term detrimentally affects the behavior of PBP lenses 910, 920, and 930 as a half-wave plate for one color channel and as a full-wave plate for the two other color channels. Thus, for off-axis light 980, a focal length for apochromatic PBP lens stack 900 may be at a focal point other than the desired single common focal point 950. As discussed below, a C-plate may be added to apochromatic PBP lens stack 900 to compensate for the added birefringent term so that off-axis light for each color channel may be focused at common focal point 950.

In the example embodiment described above and illustrated in FIG. 8, C-plates are included for each color channel in apochromatic PBP lens stack 800 to compensate for added birefringence arising from off-axis input light. In various embodiments such as that illustrated in FIG. 9, a single C-plate 905 may be added to apochromatic PBP lens stack 900 in place of multiple C-plates. Such a single C-plate may be a multi-layer C-plate, which may be a relatively thick (e.g., as compared to each of C-plates 805) birefringent film stack. Single C-plate 905 may have optical properties, such as birefringence, that may be based on optical properties of PBP lenses 910, 920, and 930.

In the example of FIG. 9, C-plate 905 operates on all color channels and is adjacent to the output side of the last PBP lens in the stack 900, which is PBP lens 930. In comparison to axis-parallel light 940, off-axis light 980 travelling through PBP lens 910 experiences an additional phase term due to the additional birefringence that is concomitant with light at a non-zero incident angle. Thus, at the output side of PBP lens 910, off-axis light 980 includes the additional phase term for the first color channel. Off-axis light 980 travelling through PBP lens 920 also experiences an additional phase term due to the additional birefringence that is concomitant with light at a non-zero incident angle. Thus, at the output side of PBP lens 920, off-axis light 980 includes the additional phase term for the second color channel. Off-axis light 980 travelling through PBP lens 930 experiences an additional phase term due to the additional birefringence that is concomitant with light at a non-zero incident angle. Thus, at the output side of PBP lens 930, off-axis light 980 includes the additional phase term for the third color channel. Subsequently, the off-axis light having the additional phase terms for each of the color channels traveling through C-plate 905 experiences respective phase terms that are equal and opposite to the additional phase terms imposed by each of PBP lenses 910, 920, and 930. Thus, at the output side of C-plate 905, off-axis light 980 no longer includes additional phase terms imposed earlier by the stack of PBP lens. By such a process, most off-axis light 980 for all color channels may be focused at the same focal point (e.g., 950) as axis-parallel light 940.

Figure 10:
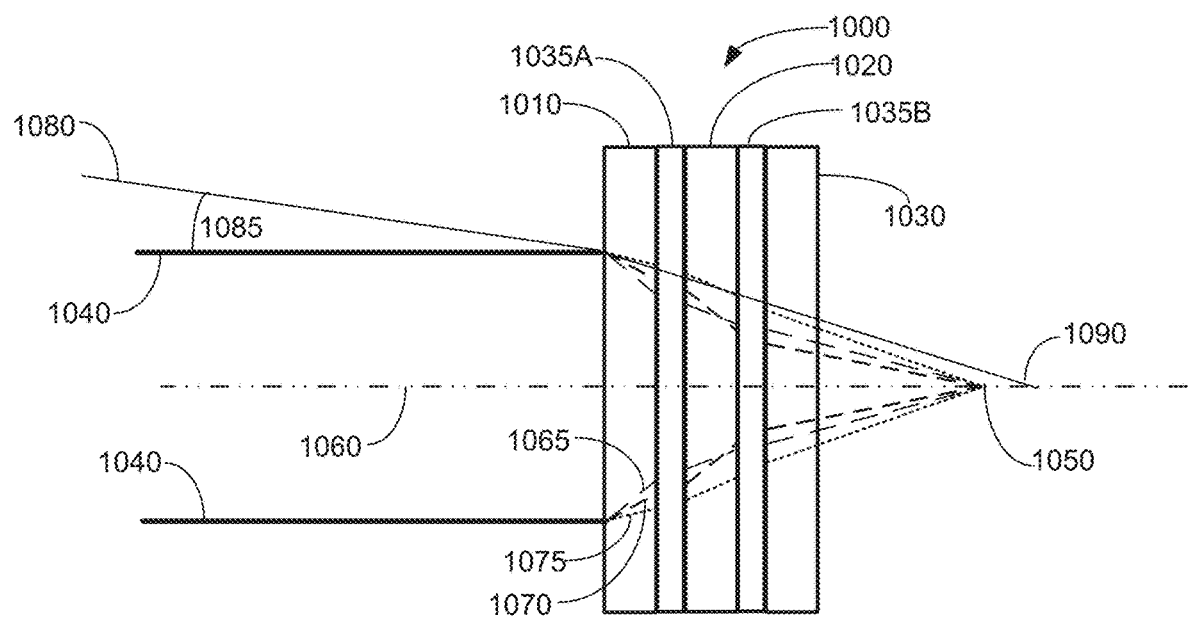
FIG. 10 illustrates a stack of PBP lenses that includes color-selective filters, according to an embodiment.

FIG. 10 illustrates an apochromatic PBP lens stack 1000, according to various embodiments. Lens stack 1000 is configured to eliminate the problem associated with PBP lens 510, illustrated in FIG. 5, which has different focal lengths for different wavelengths. PBP lens stack 1000 comprises a first PBP lens 1010, a second PBP lens 1020, and a third PBP lens 1030, each associated with a different color channel (e.g., red, green, and blue). PBP lens stack 1000 also comprises color-selective filters 1035A and 1035B.

A color-selective filter is a multi-layer birefringent film that behaves as a half-wave plate for one color channel and a full-wave plate for other color channels. Generally, a half-wave plate reverses the handedness of circularly polarized light (e.g., right-hand circularly polarized light becomes left-hand circularly polarized light upon transmitting through a half wave plate, and vice versa). A full-wave plate does not impose such a change.

In some embodiments, first PBP lens 1010, second PBP lens 1020, and third PBP lens 1030 are configured to provide positive optical power (e.g., increasing light cone convergence) to left-hand circularly polarized light and to provide negative optical power (e.g., decreasing light cone convergence) to right-hand circularly polarized light. Moreover, the handedness of circularly polarized light switches (right to left and vice versa) upon travelling through the PBP lenses.

In various embodiments, placing color-selective filters among PBP lenses 1010, 1020, and 1030 allows for controlling the focus of the individual color channels as the associated light travels through the respective PBP lenses and color-selective filters. For example, input light 1040, which includes three color channels (e.g., red, green, and blue) transmits through first PBP lens 1010, which provides a wavelength-dependent optical power to the light. Accordingly, for light 1040 comprising red color channel 1065, green color channel 1070, and blue color channel 1075 that are all left circularly polarized, first PBP lens 1010 provides a first optical power for the red channel, a second optical power for the green channel, and a third optical power for the blue channel. The handedness of the three channels switches to right circularly polarized. Next, all three channels of light travel through color-selective filter 1035A. In this example, color-selective filter 1035A is configured to behave as a half wave plate for the red channel and as a full-wave plate for the green and blue channels. Thus, color-selective filter 1035A changes the handedness of the red channel from right to left circularly polarized, while the handedness of the green and blue channels remains the same (right circularly polarized). Second PBP lens 1020 provides optical power to the color channels based on the respective handedness of the color channels. Accordingly, second PBP lens 1020 provides the red channel with a positive optical power and provides the green and blue channels with negative optical powers. In this fashion, first PBP lens 1010, second PBP lens 1020, third PBP lens 1030, and color-selective filters 1035A and 1035B can provide a combination of positive and negative optical powers so that a net result is that all colors channels are focused at a common focal point 1050.

As described above, apochromatic PBP lens stack 1000 focuses light of different color channels to a single common focal point 1050 for input light 1040, which is perpendicularly incident on lens stack 1000 and parallel with an optical axis 1060. FIG. 10 also illustrates off-axis light 1080 having an angle of incidence 1085 with respect to optical axis 1060. Each of first PBP lens 1010, second PBP lens 1020, third PBP lens 1030, and color-selective filters 1035A and 1035B is birefringent and thus performs with a dependency on wavelength and incident angle. The dependency on wavelength is considered and discussed above, and dealt with by including color-selective filters in PBP lens stack 1000. The dependency on incident angle is now considered and discussed.

Though the combination of first PBP lens 1010, second PBP lens 1020, third PBP lens 1030, and color-selective filters 1035A and 1035B is configured to focus all color channels to common focal point 1050, such a configuration relies on input light 1040 being axis-parallel light (or substantially axis-parallel light) and not off-axis light such as, for example off-axis light 1080. For example, color-selective filters 1035A and 1035B may provide half wave birefringence to axis-parallel light 1040 for particular color channels, but provide added birefringent terms that depend on angle 1085. The added birefringent terms detrimentally affect the behavior of color-selective filters 1035A and 1035B to behave as a half-wave plates (or full-wave plates) for the various color channels. Thus, for off-axis light 1080, due to induced light leakage from non-halfwave birefringence effect of the geometrical phase, an undesired extra focal length for apochromatic PBP lens stack 1000 may appear at a focal point 1090 as a ghost image other than of the desired single common focal point 1050. As discussed below, one or more C-plates may be added to apochromatic PBP lens stack 1000 to compensate for the added birefringent terms so that most off-axis light may be focused at common focal point 1050.

Figure 11:
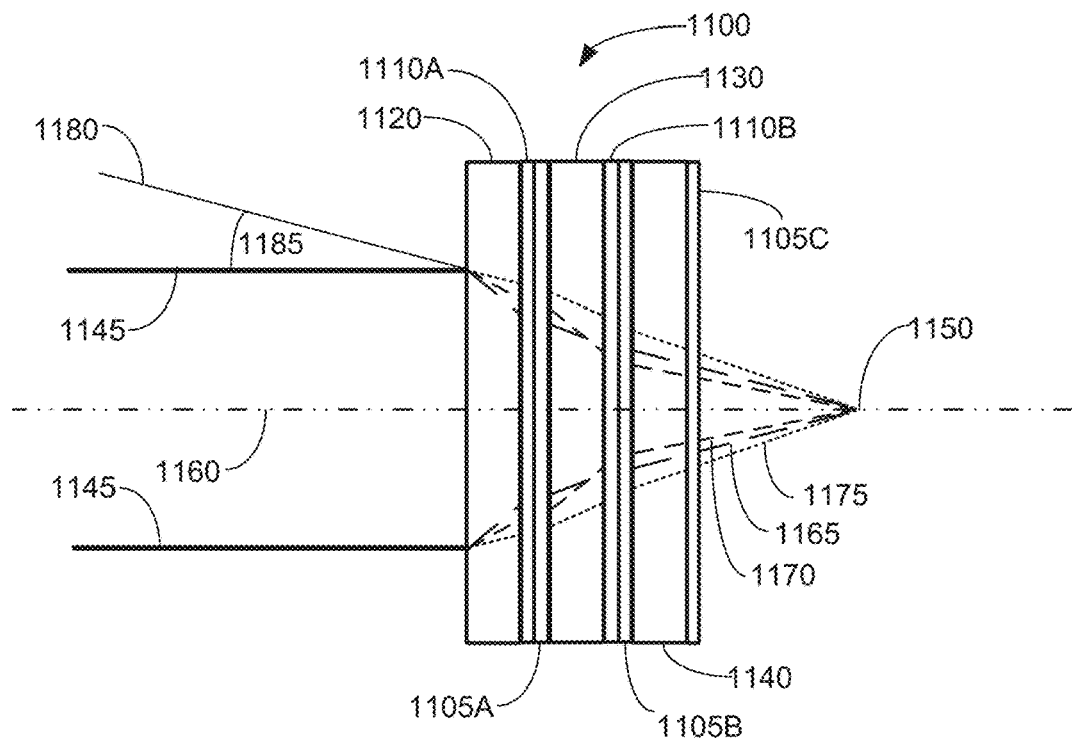
FIG. 11 illustrates a stack of PBP lenses that includes C-plates and color-selective filters, according to an embodiment.

FIG. 11 illustrates an apochromatic PBP lens stack 1100 that includes C-plates 1105 and color-selective filters 1110, according to an embodiment. With the inclusion of the C-plates and the color-selective filters, lens stack 1100 is configured to eliminate the problem associated with PBP lens 510, illustrated in FIG. 5, which has different focal lengths for different wavelengths and for off-axis light. PBP lens stack 1100 comprises a first PBP lens 1120, a second PBP lens 1130, and a third PBP lens 1140, each associated with a different color channel (e.g., red, green, and blue).

PBP lens stack 1100 is similar to PBP lens stack 1000, which, as described above, focuses light of different color channels to a single common focal point 1050 for input light 1040, which is perpendicularly incident on lens stack 1000 and parallel with an optical axis 1060. Similarly, PBP lens stack 1100 focuses light of different color channels to a single common focal point 1150 for input light 1145, which is perpendicularly incident on lens stack 1100 and parallel with an optical axis 1160. In the case of PBP lens stack 1000, however, input light is required to be substantially axis-parallel light in order to focus all color channels to common focal point 1050. In contrast, PBP lens stack 1100 is able to focus light of different color channels to a single common focal point 1150 for off-axis light, indicated by label 1180 in FIG. 11.

FIG. 11 also illustrates off-axis light 1180 having an angle of incidence 1185 with respect to optical axis 1160. Each of first PBP lens 1120, second PBP lens 1130, third PBP lens 1140, and color-selective filters 1110A and 1110B is birefringent and thus performs with a dependency on wavelength and incident angle. The dependency on wavelength is considered and discussed above, and dealt with by including color-selective filters in PBP lens stack 1100. The dependency on incident angle is now considered and discussed.

Color selective filters 1110A and 1110B may provide half wave birefringence to axis-parallel light 1145 for particular color channels, but provide added birefringent terms that depend on angle 1185 for off-axis light 1180. The added birefringent terms detrimentally affect the behavior of the color-selective filters to behave as a half-wave plates (or full-wave plates) for the various color channels. Thus, for part of the off-axis light 1180, an extra focal length for apochromatic PBP lens stack 1100 may be at a focal point that is different from the desired single common focal point 1150. C-plates 1105A, 1105B, and 1105C at least partially compensate for the added birefringent terms so that most off-axis light may be focused at common focal point 1050.

In various embodiments, C-plates may be included for each color channel in an apochromatic PBP lens stack to compensate for added birefringence arising from off-axis input light. In the example of FIG. 11, for a first color channel 1165, C-plate 1105A is adjacent to the output side of PBP lens 1120 and color-selective filter 1110A. For a second color channel 1170, C-plate 1105B is adjacent to the output side of PBP lens 1130 and color-selective filter 1110B. For a third color channel 1175, C-plate 1105C is adjacent to the output side of PBP lens 1140. In comparison to axis-parallel light 1145, off-axis light 1180 travelling through PBP lens 1120 and color-selective filter 1110A experiences additional phase terms due to the additional birefringence that is concomitant with light at a non-zero incident angle. Thus, at the output side of PBP lens 1120 and color-selective filter 1110A, off-axis light 1180 includes the additional phase terms for the first color channel. Subsequently, the off-axis light traveling through C-plate 1105A experiences a phase term that is equal and opposite to the sum of the additional phase terms imposed by PBP lens 1120 and color-selective filter 1110A. Thus, at the output side of C-plate 1105A, off-axis light 1180 no longer includes the additional phase terms imposed earlier by PBP lens 1120 and color-selective filter 1110A. By such a process, most off-axis light 1180 for the first color channel may be focused at the same focal point (e.g., 1150) as for axis-parallel light 1145.

Similar to the for PBP lens 1120 and color-selective filter 1110A described above, in comparison to axis-parallel light 1145, off-axis light 1180 travelling through PBP lens 1130 and color-selective filter 1110B experiences additional phase terms due to the additional birefringence that is concomitant with light at a non-zero incident angle. Thus, at the output side of PBP lens 1130 and color-selective filter 1110B, off-axis light 1180 includes the additional phase terms for the second color channel. Subsequently, the off-axis light traveling through C-plate 1105B experiences a phase term that is equal and opposite to the sum of the additional phase terms imposed by PBP lens 1130 and color-selective filter 1110B. Thus, at the output side of C-plate 1105B, off-axis light 1180 no longer includes the additional phase terms imposed earlier by PBP lens 1130 and color-selective filter 1110B. By such a process, most off-axis light 1180 for the second color channel may be focused at the same focal point (e.g., 1150) as for axis-parallel light 1145. Finally, in comparison to axis-parallel light 1145, off-axis light 1180 travelling through PBP lens 1140 experiences an additional phase term due to the additional birefringence that is concomitant with light at a non-zero incident angle. Thus, at the output side of PBP lens 1140, off-axis light 1180 includes the additional phase term for the third color channel. Subsequently, the off-axis light traveling through C-plate 1105C experiences a phase term that is equal and opposite to the additional phase term imposed by PBP lens 1140. Thus, at the output side of C-plate 1105C, off-axis light 1180 no longer includes the additional phase term imposed earlier by PBP lens 1140. By such a process, most off-axis light 1180 for the third color channel may be focused at the same focal point (e.g., 1150) as for axis-parallel light 1145.

Figure 12:
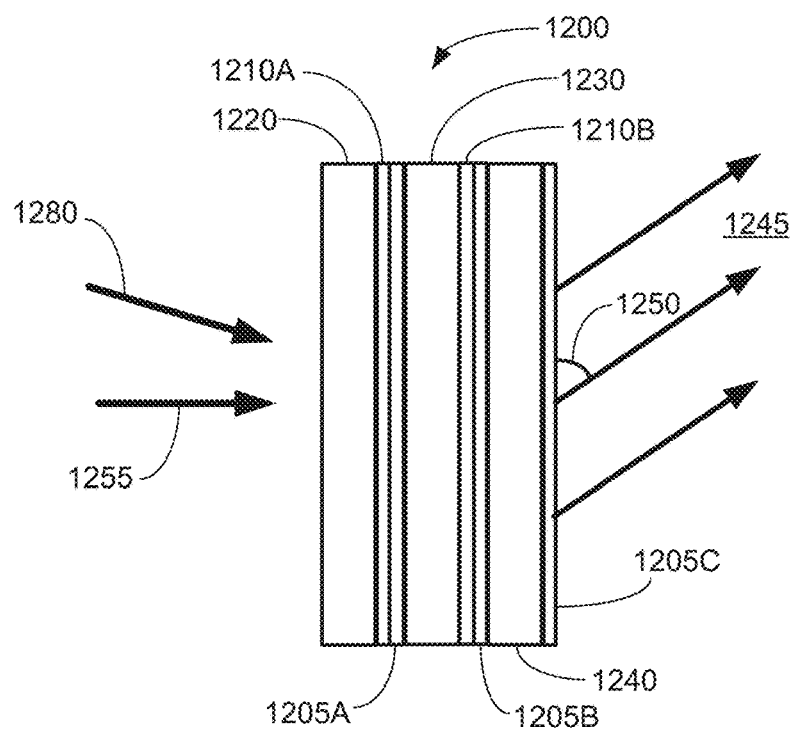
FIG. 12 illustrates a stack of PBP gratings that includes C-plates and color-selective filters, according to an embodiment.

FIG. 12 illustrates an apochromatic PBP grating stack 1200 that includes C-plates 1205 and color-selective filters 1210, according to an embodiment. With the inclusion of the C-plates and the color-selective filters, grating stack 1200 is configured to eliminate the problem of different steering angles and light leakage to $0^{th}$ diffraction order for different wavelengths and for off-axis light. PBP grating stack 1200 comprises a first PBP grating 1220, a second PBP grating 1230, and a third PBP grating 1240, each associated with a different color channel (e.g., red, green, and blue). PBP grating stack 1200 is able to produce output light 1245 from most of the input light of different color channels at a single common steering angle 1250 for different wavelengths and for off-axis light.

Each of first PBP grating 1220, second PBP grating 1230, third PBP grating 1240, and color-selective filters 1210A and 1210B is birefringent and thus performs with a dependency on wavelength and incident angle of input light. Color selective filters 1210A and 1210B may provide half wave birefringence to axis-parallel light 1255 for particular color channels, but provide added birefringent terms that depend on an incident angle for off-axis light 1280. The added birefringent terms detrimentally affect the behavior of the color-selective filters to behave as a half-wave plates (or full-wave plates) for the various color channels. Thus, for off-axis light 1280, a steering angle for apochromatic PBP grating stack 1200 may be at an angle that is different from the desired single common angle 1250. C-plates 1205A, 1205B, and 1205C at least partially compensate for the added birefringent terms so that most off-axis light may be steered at common angle 1250.

In various embodiments, C-plates may be included for each color channel in an apochromatic PBP grating stack to compensate for added birefringence arising from off-axis input light. In the example of FIG. 12, for a first color channel, C-plate 1205A is adjacent to the output side of PBP grating 1220 and color-selective filter 1210A. For a second color channel, C-plate 1205B is adjacent to the output side of PBP grating 1230 and color-selective filter 1210B. For a third color channel, C-plate 1205C is adjacent to the output side of PBP grating 1240. In comparison to axis-parallel light 1255, off-axis light 1280 travelling through PBP grating 1220 and color-selective filter 1210A experiences additional phase terms due to the additional birefringence that is concomitant with light at a non-zero incident angle. Thus, at the output side of PBP grating 1220 and color-selective filter 1210A, off-axis light 1280 includes the additional phase terms for the first color channel. Subsequently, the off-axis light traveling through C-plate 1205A experiences a phase term that is equal and opposite to the sum of the additional phase terms imposed by PBP grating 1220 and color-selective filter 1210A. Thus, at the output side of C-plate 1205A, off-axis light 1280 no longer includes the additional phase terms imposed earlier by PBP grating 1220 and color-selective filter 1210A. By such a process, most off-axis light 1280 for the first color channel may be steered at the same angle (e.g., 1250) as for axis-parallel light 1255.

Similarly to the situation for PBP grating 1220 and color-selective filter 1210A described above, in comparison to axis-parallel light 1255, off-axis light 1280 travelling through PBP grating 1230 and color-selective filter 1210B experiences additional phase terms due to the additional birefringence that is concomitant with light at a non-zero incident angle. Thus, at the output side of PBP grating 1230 and color-selective filter 1210B, off-axis light 1280 includes the additional phase terms for the second color channel. Subsequently, the off-axis light traveling through C-plate 1205B experiences a phase term that is equal and opposite to the sum of the additional phase terms imposed by PBP grating 1230 and color-selective filter 1210B. Thus, at the output side of C-plate 1205B, off-axis light 1280 no longer includes the additional phase terms imposed earlier by PBP grating 1230 and color-selective filter 1210B. By such a process, most off-axis light 1280 for the second color channel may be steered at the same angle (e.g., 1250) as for axis-parallel light 1255. Finally, in comparison to axis-parallel light 1255, off-axis light 1280 travelling through PBP grating 1240 experiences an additional phase term due to the additional birefringence that is concomitant with light at a non-zero incident angle. Thus, at the output side of PBP grating 1240, off-axis light 1280 includes the additional phase term for the third color channel. Subsequently, the off-axis light traveling through C-plate 1205C experiences a phase term that is equal and opposite to the additional phase term imposed by PBP grating 1240. Thus, at the output side of C-plate 1205C, off-axis light 1280 no longer includes the additional phase term imposed earlier by PBP grating 1240. By such a process, most off-axis light 1280 for the third color channel may be steered at the same angle (e.g., 1250) as for axis-parallel light 1255.

Figure 13:
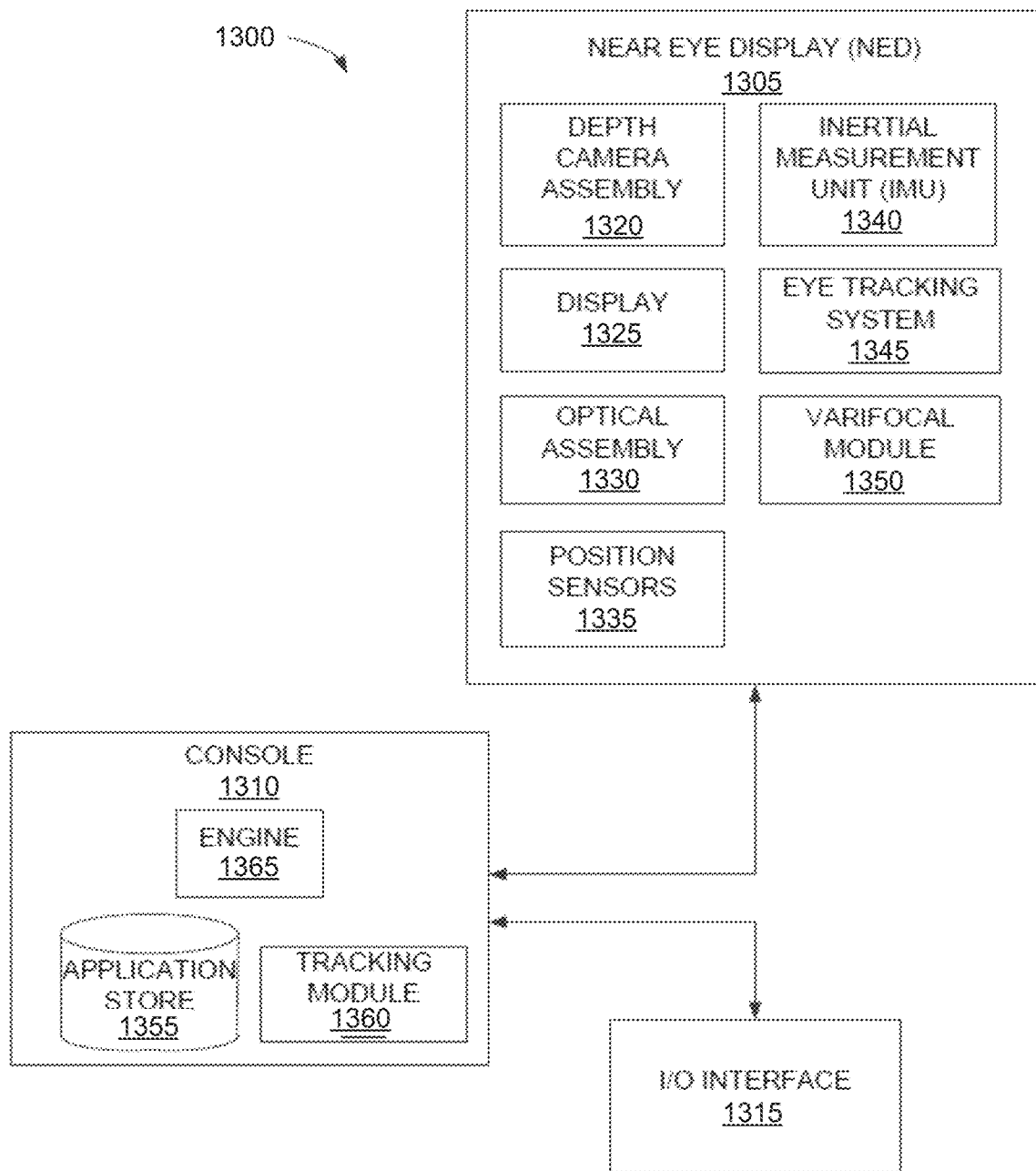
FIG. 13 is a block diagram of an embodiment of a NED system in which a console operates.

FIG. 13 is a block diagram of an embodiment of a near eye display (NED) system 1300 in which a console 1310 operates. The NED system 1300 may operate in a virtual reality (VR) system environment, an augmented reality (AR) system environment, a mixed reality (MR) system environment, or some combination thereof. The NED system 1300 shown in FIG. 13 comprises a NED 1305 and an input/output (I/O) interface 1315 that is coupled to the console 1310.

While FIG. 13 shows an example NED system 1300 including one NED 1305 and one I/O interface 1315, in other embodiments any number of these components may be included in the NED system 1300. For example, there may be multiple NEDs 1305 that each has an associated I/O interface 1315, where each NED 1305 and I/O interface 1315 communicates with the console 1310. In alternative configurations, different and/or additional components may be included in the NED system 1300. Additionally, various components included within the NED 1305, the console 1310, and the I/O interface 1315 may be distributed in a different manner than is described in conjunction with FIG. 13 in some embodiments. For example, some or all of the functionality of the console 1310 may be provided by the NED 1305.

The NED 1305 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 1305 may also present audio content to a user. The NED 1305 and/or the console 1310 may transmit the audio content to an external device via the I/O interface 1315. The external device may include various forms of speaker systems and/or headphones. In various embodiments, the audio content is synchronized with visual content being displayed by the NED 1305.

The NED 1305 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 13, the NED 1305 may include a depth camera assembly (DCA) 1320, a display 1325, an optical assembly 1330, one or more position sensors 1335, an inertial measurement unit (IMU) 1340, an eye tracking system 1345, and a varifocal module 1350. In some embodiments, the display 1325 and the optical assembly 1330 can be integrated together into a projection assembly. Various embodiments of the NED 1305 may have additional, fewer, or different components than those listed above. Additionally, the functionality of each component may be partially or completely encompassed by the functionality of one or more other components in various embodiments.

The DCA 1320 captures sensor data describing depth information of an area surrounding the NED 1305. The sensor data may be generated by one or a combination of depth imaging techniques, such as triangulation, structured light imaging, time-of-flight imaging, laser scan, and so forth. The DCA 1320 can compute various depth properties of the area surrounding the NED 1305 using the sensor data. Additionally or alternatively, the DCA 1320 may transmit the sensor data to the console 1310 for processing.

The DCA 1320 includes an illumination source, an imaging device, and a controller. The illumination source emits light onto an area surrounding the NED 1305. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 1305, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The display 1325 displays two-dimensional or three-dimensional images to the user in accordance with pixel data received from the console 1310. In various embodiments, the display 1325 comprises a single display or multiple displays (e.g., separate displays for each eye of a user). In some embodiments, the display 1325 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the displays types may be incorporated in display 1325 and used separately, in parallel, and/or in combination.

The optical assembly 1330 magnifies image light received from the display 1325, corrects optical errors associated with the image light, and presents the corrected image light to a user of the NED 1305. The optical assembly 1330 includes a plurality of optical elements. For example, one or more of the following optical elements may be included in the optical assembly 1330: an aperture, a Fresnel lens, a convex lens, a concave lens, a filter, a reflecting surface, or any other suitable optical element that deflects, reflects, refracts, and/or in some way alters image light. Moreover, the optical assembly 1330 may include combinations of different optical elements. In some embodiments, one or more of the optical elements in the optical assembly 1330 may have one or more coatings, such as partially reflective or antireflective coatings. The optical assembly 1330 can be integrated into a projection assembly, e.g., a projection assembly. In one embodiment, the optical assembly 1330 includes the optics block 135.

In operation, the optical assembly 1330 magnifies and focuses image light generated by the display 1325. In so doing, the optical assembly 1330 enables the display 1325 to be physically smaller, weigh less, and consume less power than displays that do not use the optical assembly 1330. Additionally, magnification may increase the field of view of the content presented by the display 1325. For example, in some embodiments, the field of view of the displayed content partially or completely uses a user's field of view. For example, the field of view of a displayed image may meet or exceed 1310 degrees. In various embodiments, the amount of magnification may be adjusted by adding or removing optical elements.

In some embodiments, the optical assembly 1330 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 1325 is pre-distorted, and the optical assembly 1330 corrects the distortion as image light from the display 1325 passes through various optical elements of the optical assembly 1330. In some embodiments, optical elements of the optical assembly 1330 are integrated into the display 1325 as a projection assembly that includes at least one waveguide coupled with one or more optical elements.

The IMU 1340 is an electronic device that generates data indicating a position of the NED 1305 based on measurement signals received from one or more of the position sensors 1335 and from depth information received from the DCA 1320. In some embodiments of the NED 1305, the IMU 1340 may be a dedicated hardware component. In other embodiments, the IMU 1340 may be a software component implemented in one or more processors. In one embodiment, the IMU 1340 is the same component as the IMU 1315 of FIG. 13A and the position sensors 1335 are the same components as the position sensors 1320.

In operation, a position sensor 1335 generates one or more measurement signals in response to a motion of the NED 1305. Examples of position sensors 1335 include: one or more accelerometers, one or more gyroscopes, one or more magnetometers, one or more altimeters, one or more inclinometers, and/or various types of sensors for motion detection, drift detection, and/or error detection. The position sensors 1335 may be located external to the IMU 1340, internal to the IMU 1340, or some combination thereof.

Based on the one or more measurement signals from one or more position sensors 1335, the IMU 1340 generates data indicating an estimated current position of the NED 1305 relative to an initial position of the NED 1305. For example, the position sensors 1335 include multiple accelerometers to measure translational motion (forward/back, up/down, left/right) and multiple gyroscopes to measure rotational motion (e.g., pitch, yaw, and roll). In some embodiments, the IMU 1340 rapidly samples the measurement signals and calculates the estimated current position of the NED 1305 from the sampled data. For example, the IMU 1340 integrates the measurement signals received from the accelerometers over time to estimate a velocity vector and integrates the velocity vector over time to determine an estimated current position of a reference point on the NED 1305. Alternatively, the IMU 1340 provides the sampled measurement signals to the console 1310, which analyzes the sample data to determine one or more measurement errors. The console 1310 may further transmit one or more of control signals and/or measurement errors to the IMU 1340 to configure the IMU 1340 to correct and/or reduce one or more measurement errors (e.g., drift errors). The reference point is a point that may be used to describe the position of the NED 1305. The reference point may generally be defined as a point in space or a position related to a position and/or orientation of the NED 1305.

In various embodiments, the IMU 1340 receives one or more parameters from the console 1310. The one or more parameters are used to maintain tracking of the NED 1305. Based on a received parameter, the IMU 1340 may adjust one or more IMU parameters (e.g., a sample rate). In some embodiments, certain parameters cause the IMU 1340 to update an initial position of the reference point so that it corresponds to a next position of the reference point. Updating the initial position of the reference point as the next calibrated position of the reference point helps reduce drift errors in detecting a current position estimate of the IMU 1340.

In some embodiments, the eye tracking system 1345 is integrated into the NED 1305. The eye-tracking system 1345 may comprise one or more illumination sources and an imaging device (camera). In operation, the eye tracking system 1345 generates and analyzes tracking data related to a user's eyes as the user wears the NED 1305. The eye tracking system 1345 may further generate eye tracking information that may comprise information about a position of the user's eye, i.e., information about an angle of an eye-gaze.

In some embodiments, the varifocal module 1350 is further integrated into the NED 1305. The varifocal module 1350 may be communicatively coupled to the eye tracking system 1345 in order to enable the varifocal module 1350 to receive eye tracking information from the eye tracking system 1345. The varifocal module 1350 may further modify the focus of image light emitted from the display 1325 based on the eye tracking information received from the eye tracking system 1345. Accordingly, the varifocal module 1350 can reduce vergence-accommodation conflict that may be produced as the user's eyes resolve the image light. In various embodiments, the varifocal module 1350 can be interfaced (e.g., either mechanically or electrically) with at least one optical element of the optical assembly 1330.

In operation, the varifocal module 1350 may adjust the position and/or orientation of one or more optical elements in the optical assembly 1330 in order to adjust the focus of image light propagating through the optical assembly 1330. In various embodiments, the varifocal module 1350 may use eye tracking information obtained from the eye tracking system 1345 to determine how to adjust one or more optical elements in the optical assembly 1330. In some embodiments, the varifocal module 1350 may perform foveated rendering of the image light based on the eye tracking information obtained from the eye tracking system 1345 in order to adjust the resolution of the image light emitted by the display 1325. In this case, the varifocal module 1350 configures the display 1325 to display a high pixel density in a foveal region of the user's eye-gaze and a low pixel density in other regions of the user's eye-gaze.

The I/O interface 1315 facilitates the transfer of action requests from a user to the console 1310. In addition, the I/O interface 1315 facilitates the transfer of device feedback from the console 1310 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 1315 may include one or more input devices. Example input devices include: a keyboard, a mouse, a game controller, a joystick, and/or any other suitable device for receiving action requests and communicating the action requests to the console 1310. In some embodiments, the I/O interface 1315 includes an IMU 1340 that captures calibration data indicating an estimated current position of the I/O interface 1315 relative to an initial position of the I/O interface 1315.

In operation, the I/O interface 1315 receives action requests from the user and transmits those action requests to the console 1310. Responsive to receiving the action request, the console 1310 performs a corresponding action. For example, responsive to receiving an action request, console 1310 may configure I/O interface 1315 to emit haptic feedback onto an arm of the user. For example, console 1315 may configure I/O interface 1315 to deliver haptic feedback to a user when an action request is received. Additionally or alternatively, the console 1310 may configure the I/O interface 1315 to generate haptic feedback when the console 1310 performs an action, responsive to receiving an action request.

The console 1310 provides content to the NED 1305 for processing in accordance with information received from one or more of: the DCA 1320, the NED 1305, and the I/O interface 1315. In the embodiment shown in FIG. 13, the console 1310 includes an application store 1355, a tracking module 1360, and an engine 1365. In some embodiments, the console 1310 may have additional, fewer, or different modules and/or components than those described in conjunction with FIG. 13. Similarly, the functions further described below may be distributed among components of the console 1310 in a different manner than described in conjunction with FIG. 13.

The application store 1355 stores one or more applications for execution by the console 1310. An application is a group of instructions that, when executed by a processor, performs a particular set of functions, such as generating content for presentation to the user. For example, an application may generate content in response to receiving inputs from a user (e.g., via movement of the NED 1305 as the user moves his/her head, via the I/O interface 1315, etc.). Examples of applications include: gaming applications, conferencing applications, video playback applications, or other suitable applications.

The tracking module 1360 calibrates the NED system 1300 using one or more calibration parameters. The tracking module 1360 may further adjust one or more calibration parameters to reduce error in determining a position and/or orientation of the NED 1305 or the I/O interface 1315. For example, the tracking module 1360 may transmit a calibration parameter to the DCA 1320 in order to adjust the focus of the DCA 1320. Accordingly, the DCA 1320 may more accurately determine positions of structured light elements reflecting off of objects in the environment. The tracking module 1360 may also analyze sensor data generated by the IMU 1340 in determining various calibration parameters to modify. Further, in some embodiments, if the NED 1305 loses tracking of the user's eye, then the tracking module 1360 may re-calibrate some or all of the components in the NED system 1300. For example, if the DCA 1320 loses line of sight of at least a threshold number of structured light elements projected onto the user's eye, the tracking module 1360 may transmit calibration parameters to the varifocal module 1350 in order to re-establish eye tracking.

The tracking module 1360 tracks the movements of the NED 1305 and/or of the I/O interface 1315 using information from the DCA 1320, the one or more position sensors 1335, the IMU 1340 or some combination thereof. For example, the tracking module 1360 may determine a reference position of the NED 1305 from a mapping of an area local to the NED 1305. The tracking module 1360 may generate this mapping based on information received from the NED 1305 itself. The tracking module 1360 may also utilize sensor data from the IMU 1340 and/or depth data from the DCA 1320 to determine references positions for the NED 1305 and/or I/O interface 1315. In various embodiments, the tracking module 1360 generates an estimation and/or prediction for a subsequent position of the NED 1305 and/or the I/O interface 1315. The tracking module 1360 may transmit the predicted subsequent position to the engine 1365.

The engine 1365 generates a three-dimensional mapping of the area surrounding the NED 1305 (i.e., the "local area") based on information received from the NED 1305. In some embodiments, the engine 1365 determines depth information for the three-dimensional mapping of the local area based on depth data received from the DCA 1320 (e.g., depth information of objects in the local area). In some embodiments, the engine 1365 calculates a depth and/or position of the NED 1305 by using depth data generated by the DCA 1320. In particular, the engine 1365 may implement various techniques for calculating the depth and/or position of the NED 1305, such as stereo based techniques, structured light illumination techniques, time-of-flight techniques, and so forth. In various embodiments, the engine 1365 uses depth data received from the DCA 1320 to update a model of the local area and to generate and/or modify media content based in part on the updated model.

The engine 1365 also executes applications within the NED system 1300 and receives position information, acceleration information, velocity information, predicted future positions, or some combination thereof, of the NED 1305 from the tracking module 1360. Based on the received information, the engine 1365 determines various forms of media content to transmit to the NED 1305 for presentation to the user. For example, if the received information indicates that the user has looked to the left, the engine 1365 generates media content for the NED 1305 that mirrors the user's movement in a virtual environment or in an environment augmenting the local area with additional media content. Accordingly, the engine 1365 may generate and/or modify media content (e.g., visual and/or audio content) for presentation to the user. The engine 1365 may further transmit the media content to the NED 1305. Additionally, in response to receiving an action request from the I/O interface 1315, the engine 1365 may perform an action within an application executing on the console 1310. The engine 1305 may further provide feedback when the action is performed. For example, the engine 1365 may configure the NED 1305 to generate visual and/or audio feedback and/or the I/O interface 1315 to generate haptic feedback to the user.

In some embodiments, based on the eye tracking information (e.g., orientation of the user's eye) received from the eye tracking system 1345, the engine 1365 determines a resolution of the media content provided to the NED 1305 for presentation to the user on the display 1325. The engine 1365 may adjust a resolution of the visual content provided to the NED 1305 by configuring the display 1325 to perform foveated rendering of the visual content, based at least in part on a direction of the user's gaze received from the eye tracking system 1345. The engine 1365 provides the content to the NED 1305 having a high resolution on the display 1325 in a foveal region of the user's gaze and a low resolution in other regions, thereby reducing the power consumption of the NED 1305. In addition, using foveated rendering reduces a number of computing cycles used in rendering visual content without compromising the quality of the user's visual experience. In some embodiments, the engine 1365 can further use the eye tracking information to adjust a focus of the image light emitted from the display 1325 in order to reduce vergence-accommodation conflicts.

1. An optical system, comprising a geometric phase element aligned with an optical axis, a birefringence of the geometric phase element providing a first polarization phase shift to light incident on the geometric phase element off-axis from the optical axis, and a C-plate adjacent to the geometric phase element and aligned with the optical axis, the C-plate providing a second polarization phase shift to the light, and the second polarization phase shift depending, at least in part, on an angle with respect to the optical axis of the light incident on the C-plate, and wherein the first polarization phase shift is opposite to the second polarization phase shift.

2. The optical system of clause 1, wherein the light comprises a first color channel and a second color channel, the geometric phase element corresponds to the first color channel, and the optical system further comprising a second geometric phase element corresponding to the second color channel, and a second C-plate adjacent to the second geometric phase element.

3. The optical system of clause 1 or 2, wherein the first geometric phase element is configured to focus a first portion of the light associated with the first color channel at a focal point and the second geometric phase element is configured to focus a second portion of the light associated with the second color channel at the particular focal point.

4. The optical system of any of clauses 1-3, wherein the geometric phase element directs a first portion of the light associated with the first color channel at a beam-steering angle and the second geometric phase element is directs a second portion of the light associated with the second color channel at the particular beam-steering angle.

5. The optical system of any of clauses 1-4, further comprising a first color-selective waveplate adjacent to the first geometric phase element and the first C-plate that applies a multiple of a half-wave polarization shift for a first wavelength of the light and a multiple of a full wave polarization shift for at least a second wavelength of the light.

6. The optical system of any of clauses 1-5, further comprising a second color-selective waveplate adjacent to the second geometric phase element and the second C-plate and configured to apply a multiple of a half-wave polarization shift for the second wavelength of the light and a multiple of a full wave polarization shift for at least the first wavelength of the light.

7. The optical system of any of clauses 1-6, wherein the first geometric phase element and the first color-selective waveplate focus a first portion of the light associated with the first color channel at a particular focal point, and the second geometric phase element and the second color-selective waveplate focus a second portion of the light associated with the second color channel at the particular focal point.

8. The optical system of any of clauses 1-7, wherein the first geometric phase element and the first color-selective waveplate directs a first portion of the light associated with the first color channel at a beam-steering angle, and the second geometric phase element and the second color-selective waveplate direct a second portion of the light associated with the second color channel at the particular beam-steering angle.

9. The optical system of any of clauses 1-8, wherein the C-plate is a multi-layer birefringence film having an angular birefringence opposite to an angular birefringence of the geometric phase element.

10. The optical system of any of clauses 1-9, wherein the geometric phase element is electrically switchable to adjust a focal length associated with the geometric phase element.

11. The optical system of of any of clauses 1-10, wherein the geometric phase element is a Pancharatnam Berry Phase (PBP) lens.

12. The optical system of any of clauses 1-11, wherein the geometric phase element is a Pancharatnam Berry Phase (PBP) grating.

13. The optical system of any of clauses 1-12, wherein the optical system is included in a head mounted device.

14. The optical system of any of clauses 1-13, further comprising a liquid crystal display (LCD) device along the optical axis and between a light source and the geometric phase element.

15. A head-mounted display (HMD), comprising an electronic display configured to emit image light that includes red, green, and blue (RGB) color channels, and an optical stack configured to receive the image light on and about an optical axis, the optical stack comprising a first Pancharatnam Berry Phase (PBP) geometric phase element, a first color-selective waveplate adjacent to the first PBP geometric phase element and configured to apply a multiple of substantially a half-wave polarization shift for a first one of the RGB color channels and a multiple of substantially a full wave polarization shift for at least a second one of the RGB color channels, a C-plate adjacent to the first color-selective waveplate, wherein the C-plate provides a first polarization phase shift to the first one of the RGB color channels, and wherein the first polarization phase shift depends, at least in part, on an angle with respect to the optical axis of the first one of the RGB color channels incident on the C-plate, and wherein the first polarization phase shift at least partially compensates for a second polarization phase shift produced by the first color-selective waveplate, a second PBP geometric phase element, and a second color-selective waveplate adjacent to the second PBP geometric phase element and configured to apply a multiple of substantially a half-wave polarization shift for the second one of the RGB color channels and a multiple of substantially a full wave polarization shift for at least the first one of the RGB color channels.

16. The HMD of clause 15, wherein the first PBP geometric phase element is a first PBP grating having a first pitch, and the second PBP geometric phase element is a second PBP grating having a second pitch that is different from the first pitch.

17. The HMD of clauses 15 or 16, wherein the first PBP geometric phase element is a first PBP lens that is configured to substantially focus light of the first one of the RGB color channels to a first location, and the second PBP geometric phase element is a second PBP lens that is configured to substantially focus light of the second one of the RGB color channels to the first location.

18. The HMD of any of clauses 15-17, further comprising one or more additional C-plates between the first and the second PBP geometric phase elements.

19. The HMD of any of clauses 15-18, wherein the first and the second PBP geometric phase elements are electrically switchable to adjust respective focal lengths associated with the first and the second PBP geometric phase elements.

20. The HMD of any of clauses 15-19, wherein the angular birefringence of the C-plate varies discontinuously across the area of the C-plate.

21. An optical system comprising an electronic display configured to emit image light that includes red, green, and blue (RGB) color channels, and an optical stack configured to receive the image light on and about an optical axis, the optical stack comprising a first Pancharatnam Berry Phase (PBP) geometric phase element to apply a multiple of substantially a half-wave polarization shift for a first one of the RGB color channels and a multiple of substantially a full wave polarization shift for at least a second one of the RGB color channels, a C-plate adjacent to the first color-selective waveplate, wherein the C-plate provides a first polarization phase shift to the first one of the RGB color channels, and wherein the first polarization phase shift depends, at least in part, on an angle with respect to the optical axis of the first one of the RGB color channels incident on the C-plate, and wherein the first polarization phase shift at least partially compensates for a second polarization phase shift produced by the first PBP geometric phase element, and a second PBP geometric phase element to apply a multiple of substantially a half-wave polarization shift for the second one of the RGB color channels and a multiple of substantially a full wave polarization shift for at least the first one of the RGB color channels.

Any and all combinations of any of the claim elements recited in any of the claims and/or any elements described in this application, in any fashion, fall within the contemplated scope of the present invention and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. An optical system, comprising:
a geometric phase element that is aligned with an optical axis and configured to provide a plurality of focal lengths or a plurality of steering angles, a birefringence of the geometric phase element providing a first polarization phase shift to light incident on the geometric phase element off-axis from the optical axis; and
a C-plate adjacent to the geometric phase element and aligned with the optical axis, the C-plate providing a second polarization phase shift to the light, the second polarization phase shift depending, at least in part, on an angle with respect to the optical axis of the light incident on the C-plate, and the first polarization phase shift being opposite to the second polarization phase shift.

2. The optical system of claim 1, wherein the light comprises a first color channel and a second color channel, the geometric phase element corresponds to the first color channel, and the optical system further comprises:
another geometric phase element corresponding to the second color channel; and
another C-plate adjacent to the other geometric phase element.

3. The optical system of claim 2, wherein the geometric phase element is configured to focus a first portion of the light associated with the first color channel at a focal point and the other geometric phase element is configured to focus a second portion of the light associated with the second color channel at the focal point.

4. The optical system of claim 2, wherein the geometric phase element directs a first portion of the light associated with the first color channel at a beam-steering angle and the other geometric phase element directs a second portion of the light associated with the second color channel at the beam-steering angle.

5. The optical system of claim 2, further comprising a first color-selective waveplate adjacent to the geometric phase element and the C-plate that applies a multiple of a half-wave polarization shift for a first wavelength of the light and a multiple of a full wave polarization shift for at least a second wavelength of the light.

6. The optical system of claim 5, further comprising a second color-selective waveplate adjacent to the other geometric phase element and the other C-plate and configured to apply a multiple of a half-wave polarization shift for the second wavelength of the light and a multiple of a full wave polarization shift for at least the first wavelength of the light.

7. The optical system of claim 6, wherein the geometric phase element and the first color-selective waveplate focus a first portion of the light associated with the first color channel at a focal point, and the other geometric phase element and the second color-selective waveplate focus a second portion of the light associated with the second color channel at the focal point.

8. The optical system of claim 6, wherein the geometric phase element and the first color-selective waveplate direct a first portion of the light associated with the first color channel at a beam-steering angle, and the other geometric phase element and the second color-selective waveplate direct a second portion of the light associated with the second color channel at the beam-steering angle.

9. The optical system of claim 1, wherein the C-plate is a multi-layer birefringence film having an angular birefringence opposite to an angular birefringence of the geometric phase element.

10. The optical system of claim 1, wherein the geometric phase element is electrically switchable to adjust a focal length associated with the geometric phase element.

11. The optical system of claim 1, wherein the geometric phase element is a Pancharatnam Berry Phase (PBP) lens.

12. The optical system of claim 1, wherein the geometric phase element is a Pancharatnam Berry Phase (PBP) grating.

13. The optical system of claim 1, wherein the optical system is included in a head mounted device.

14. The optical system of claim 1, further comprising a liquid crystal display (LCD) device along the optical axis and between a light source and the geometric phase element.

15. A head-mounted display (HMD), comprising:
an electronic display configured to emit image light that includes red, green, and blue (RGB) color channels; and
an optical stack configured to receive the image light on and about an optical axis, the optical stack comprising:
a first Pancharatnam Berry Phase (PBP) geometric phase element;
a first color-selective waveplate adjacent to the first PBP geometric phase element and configured to apply a multiple of substantially a half-wave polarization shift for a first one of the RGB color channels and a multiple of substantially a full wave polarization shift for at least a second one of the RGB color channels;
a C-plate adjacent to the first color-selective waveplate, wherein the C-plate provides a first polarization phase shift to the first one of the RGB color channels, and wherein the first polarization phase shift depends, at least in part, on an angle with respect to the optical axis of the first one of the RGB color channels incident on the C-plate, and wherein the first polarization phase shift at least partially compensates for a second polarization phase shift produced by the first color-selective waveplate;
a second PBP geometric phase element; and
a second color-selective waveplate adjacent to the second PBP geometric phase element and configured to apply a multiple of substantially a half-wave polarization shift for the second one of the RGB color channels and a multiple of substantially a full wave polarization shift for at least the first one of the RGB color channels.

16. The HMD of claim 15, wherein the first PBP geometric phase element is a first PBP grating having a first pitch, and the second PBP geometric phase element is a second PBP grating having a second pitch that is different from the first pitch.

17. The HMD of claim 15, wherein the first PBP geometric phase element is a first PBP lens that is configured to substantially focus light of the first one of the RGB color channels to a first location, and the second PBP geometric phase element is a second PBP lens that is configured to substantially focus light of the second one of the RGB color channels to the first location.

18. The HMD of claim 15, further comprising one or more additional C-plates between the first and the second PBP geometric phase elements.

19. The HMD of claim 15, wherein the first and the second PBP geometric phase elements are electrically switchable to adjust respective focal lengths associated with the first and the second PBP geometric phase elements.

20. The HMD of claim 15, wherein the angular birefringence of the C-plate varies discontinuously across the area of the C-plate.

21. An optical system comprising:
- an electronic display configured to emit image light that includes red, green, and blue (RGB) color channels; and
- an optical stack configured to receive the image light on and about an optical axis, the optical stack comprising:
  - a first Pancharatnam Berry Phase (PBP) geometric phase element to apply a multiple of substantially a half-wave polarization shift for a first one of the RGB color channels and a multiple of substantially a full wave polarization shift for at least a second one of the RGB color channels;
  - a C-plate adjacent to the first color-selective waveplate, wherein the C-plate provides a first polarization phase shift to the first one of the RGB color channels, and wherein the first polarization phase shift depends, at least in part, on an angle with respect to the optical axis of the first one of the RGB color channels incident on the C-plate, and wherein the first polarization phase shift at least partially compensates for a second polarization phase shift produced by the first PBP geometric phase element; and
  - a second PBP geometric phase element to apply a multiple of substantially a half-wave polarization shift for the second one of the RGB color channels and a multiple of substantially a full wave polarization shift for at least the first one of the RGB color channels.

* * * * *